US009605943B2

(12) United States Patent
Shimaoka et al.

(10) Patent No.: US 9,605,943 B2
(45) Date of Patent: Mar. 28, 2017

(54) MEASURING PROBE

(71) Applicant: MITUTOYO CORPORATION, Kanagawa (JP)

(72) Inventors: Atsushi Shimaoka, Kanagawa (JP); Tomoyuki Miyazaki, Kanagawa (JP); Kazuhiko Hidaka, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 41 days.

(21) Appl. No.: 14/789,211

(22) Filed: Jul. 1, 2015

(65) Prior Publication Data

US 2016/0258738 A1 Sep. 8, 2016

(30) Foreign Application Priority Data

Mar. 5, 2015 (JP) .................................. 2015-043036

(51) Int. Cl.
    *G01B 11/00* (2006.01)
    *G01B 5/012* (2006.01)

(52) U.S. Cl.
    CPC ............ *G01B 11/007* (2013.01); *G01B 5/012* (2013.01)

(58) Field of Classification Search
    CPC .......... G01B 3/008; G01B 5/012; G01B 5/20; G01B 11/007
    USPC .......................................................... 33/503
    See application file for complete search history.

(56) References Cited

U.S. PATENT DOCUMENTS

| 5,209,131 | A |   | 5/1993 | Baxter |
| 5,345,689 | A | * | 9/1994 | McMurtry | ............. | G01B 3/008 33/556 |
| 6,430,833 | B1 | * | 8/2002 | Butter | .................... | G01B 5/012 33/556 |
| 6,971,183 | B2 |   | 12/2005 | Brenner et al. |
| 7,146,741 | B2 |   | 12/2006 | Butter et al. |
| 2002/0174556 | A1 |   | 11/2002 | Butter et al. |

(Continued)

FOREIGN PATENT DOCUMENTS

| JP | H05-309551 | 11/1993 |
| JP | H05-312504 | 11/1993 |
| JP | H07-198370 | 8/1995 |
| JP | 2002-541444 | 12/2002 |

(Continued)

OTHER PUBLICATIONS

Office Action in the Japanese Patent Application No. 2015-043036 with partial English translation, dated Jul. 19, 2016.

(Continued)

*Primary Examiner* — Yaritza Guadalupe-McCall

(74) *Attorney, Agent, or Firm* — Greenblum & Bernstein, P.L.C.

(57) ABSTRACT

A measuring probe includes a stylus, an axial motion mechanism, and a rotary motion mechanism. The axial motion mechanism includes a pair of first diaphragm structures that allows a moving member to be displaced, and the rotary motion mechanism includes a second diaphragm structure that allows a rotating member to be displaced. The second diaphragm structure is disposed between the pair of first diaphragm structures in an axial direction. The respective first diaphragm structures are disposed at a symmetric distance with respect to the second diaphragm structure. This can reduce the length in the axial direction and weight thereof and also reduce shape errors and improve measurement accuracy.

19 Claims, 12 Drawing Sheets

(56) References Cited

U.S. PATENT DOCUMENTS

| | | | |
|---|---|---|---|
| 2005/0055839 A1 | 3/2005 | Brenner et al. | |
| 2007/0056177 A1 | 3/2007 | Enderle et al. | |
| 2011/0094117 A1* | 4/2011 | Groell | G01B 5/012 33/503 |
| 2012/0297906 A1* | 11/2012 | Groell | G01B 5/012 73/866.5 |
| 2013/0304250 A1* | 11/2013 | McMurtry | G01B 5/012 700/195 |
| 2014/0011444 A1* | 1/2014 | Groell | H01Q 21/28 455/39 |
| 2014/0053423 A1* | 2/2014 | Brenner | G01B 5/008 33/503 |
| 2016/0258733 A1* | 9/2016 | Shimaoka | G01B 3/008 |
| 2016/0258738 A1* | 9/2016 | Shimaoka | G01B 5/012 |
| 2016/0258744 A1* | 9/2016 | Shimaoka | G01B 11/14 |

FOREIGN PATENT DOCUMENTS

| | | |
|---|---|---|
| JP | 2006-343249 | 12/2006 |
| JP | 4417114 B | 2/2010 |
| JP | 2013-171039 | 9/2013 |

OTHER PUBLICATIONS

Extended European search report in the European Patent Application No. 15175250.8-1568, dated Aug. 3, 2016.
Decision to Grant a patent issued in Japan Patent Appl. No. 2015-043036, dated Oct. 18, 2016.
U.S. Appl. No. 14/789,266 to Atsushi Shimaoka et al., filed Jul. 1, 2015.
U.S. Appl. No. 14/789,283 to Atsushi Shimaoka et al., filed Jul. 1, 2015.

* cited by examiner

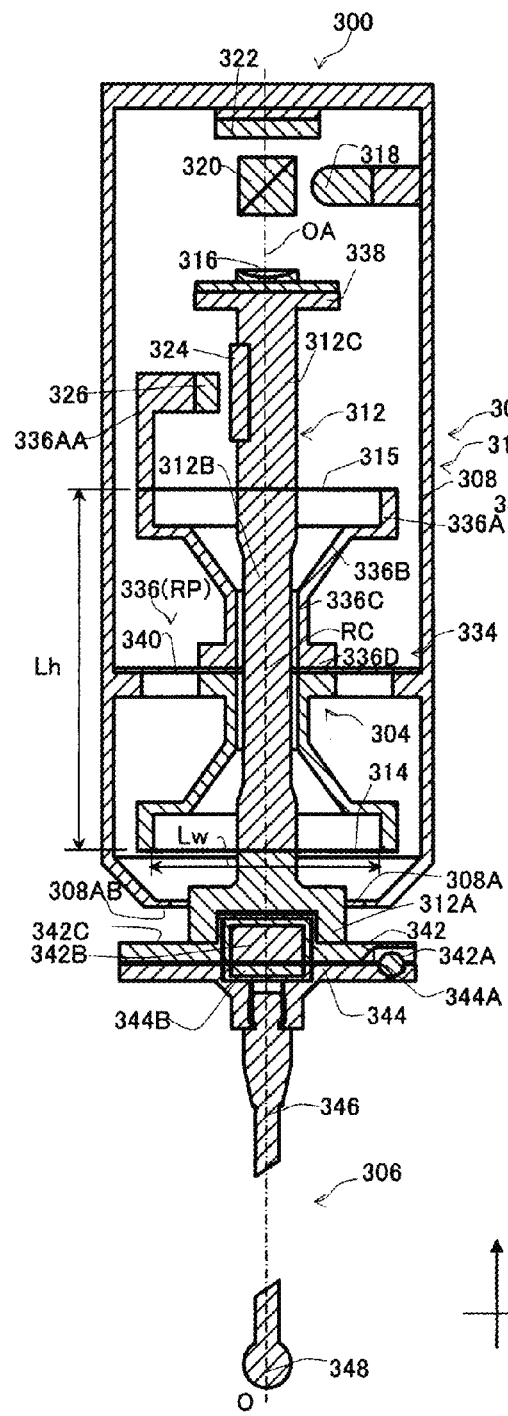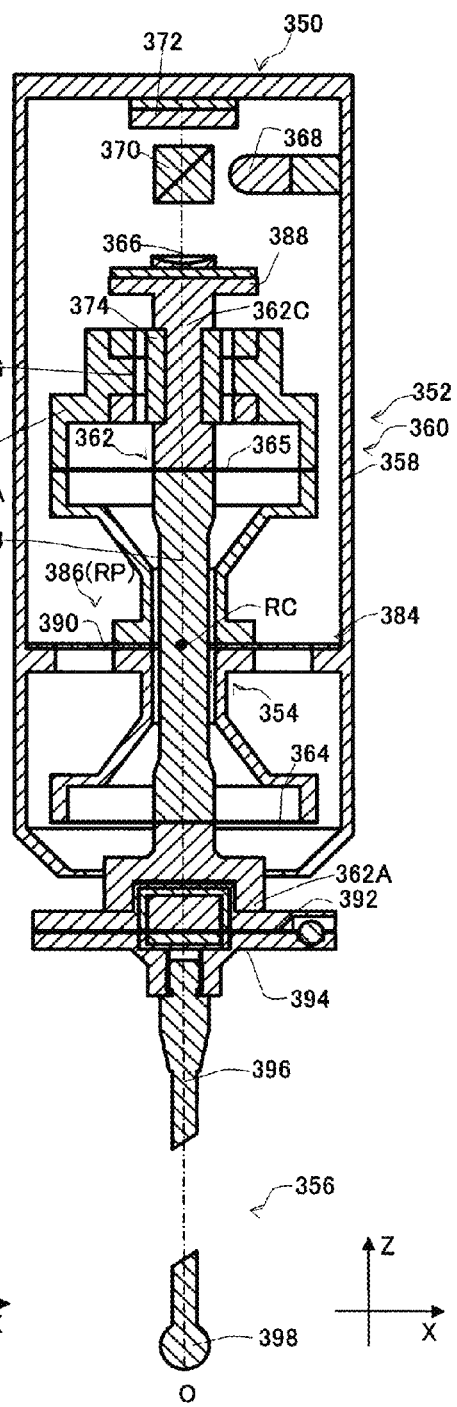

Fig. 6A
Fig. 6B
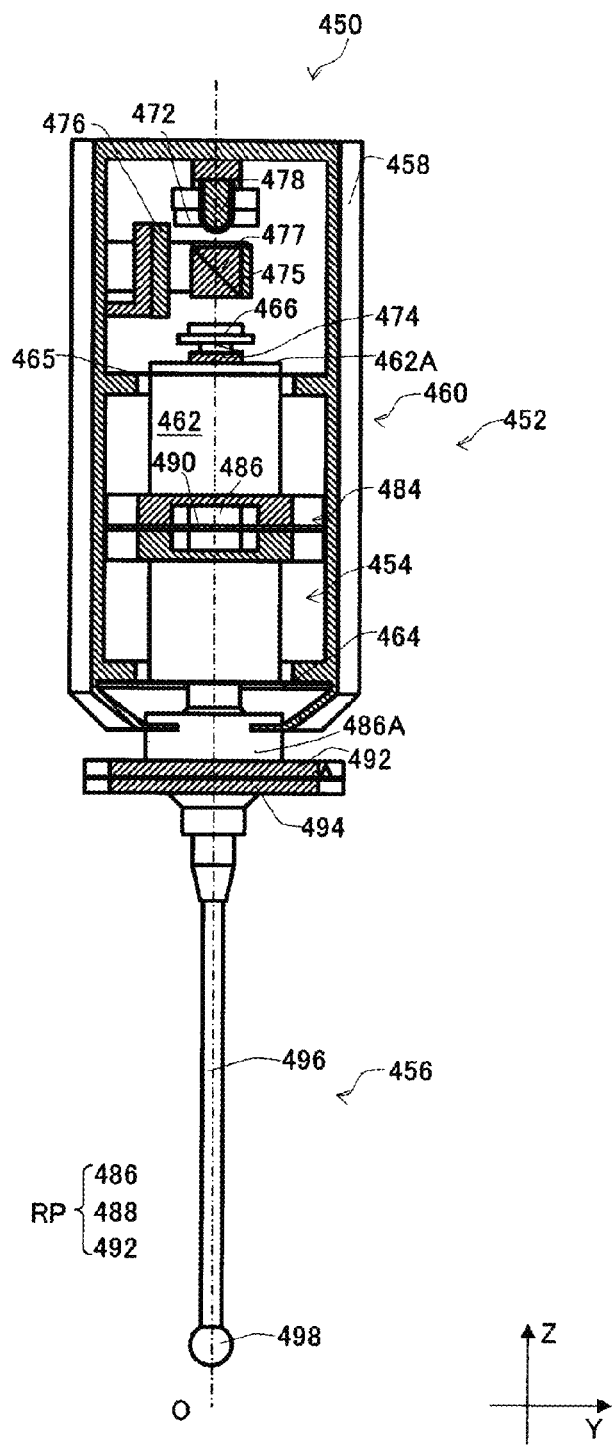
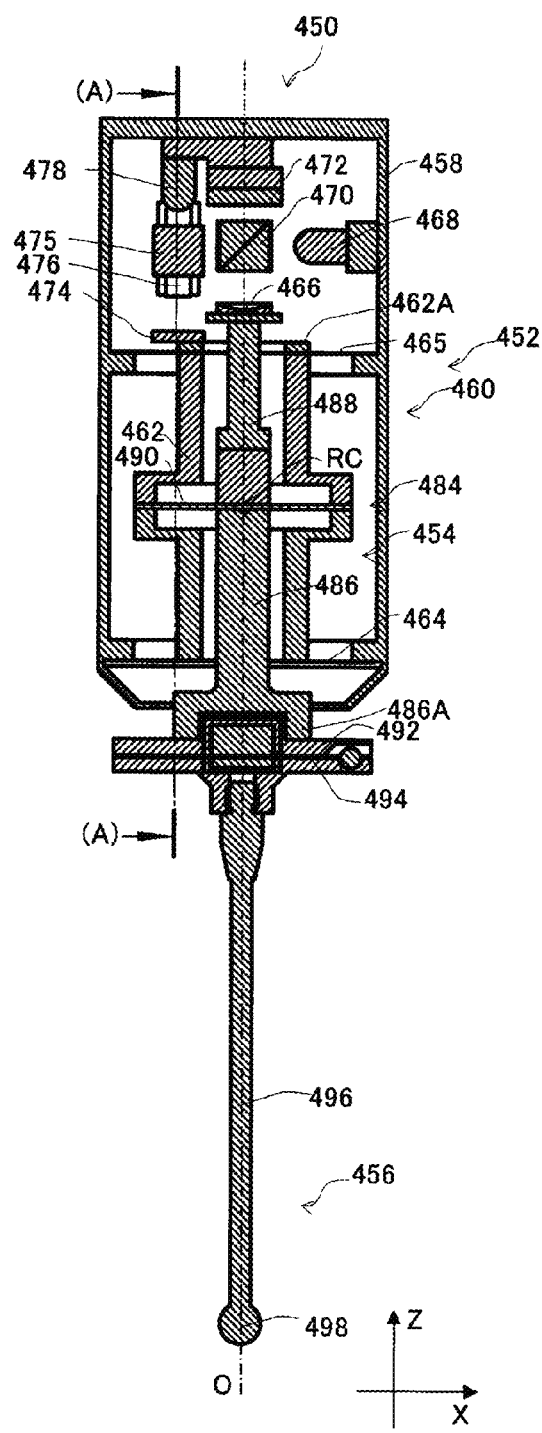

MEASURING PROBE

CROSS-REFERENCE TO RELATED APPLICATION

The disclosure of Japanese Patent Application No. 2015-043036 filed on Mar. 5, 2015 including specifications, drawings and claims is incorporated herein by reference in its entirety.

TECHNICAL FIELD

The present invention relates to a measuring probe and, in particular, to a measuring probe capable of achieving a reduced length in an axial direction and a reduced weight as well as reduced shape errors and improved measurement accuracy.

BACKGROUND ART

A three-dimensional measuring machine, for example, has been known as a measuring apparatus for measuring a surface shape of an object to be measured by contacting with the surface thereof. Japanese Patent No. 4417114 (hereinafter referred to as Patent Literature 1) describes a three-dimensional measuring machine employing a measuring probe that comes into contact with an object to be measured to detect the surface shape thereof. The measuring probe illustrated in Patent Literature 1 includes: a stylus having a contact part to be in contact with (a surface of) an object to be measured; an axial motion mechanism including a moving member that allows the contact part to move in a central axis direction (also referred to as a Z direction or an axial direction O) of the measuring probe; and a rotary motion mechanism including a rotating member that allows the contact part to move along a surface perpendicular to the Z direction by means of rotary motion. In Patent Literature 1, the axial motion mechanism and the rotary motion mechanism are connected in series and their directions in which the contact part of the stylus can move are set to be different from each other.

SUMMARY OF INVENTION

Technical Problem

According to the measuring probe described in FIGS. 3A and 3B in Patent Literature 1, however, a pair of diaphragm structures (springs 64 and 66) that constitutes the axial motion mechanism is disposed on a side closer to a tip 46 than a cardanic bearing 58, which is the rotation center of the rotary motion mechanism in the axial direction. Thus, the measuring probe inevitably has an increased length in the axial direction. Also, since the pair of diaphragm structures is eccentrically located in a lower part of the measuring probe, a balancing member for making the center of gravity coincident with the rotation center has large mass. Furthermore, a distance between the rotation center of the rotary motion mechanism and the contact part disposed at the tip of the stylus (referred to as a swivel length) is long due to the presence of the pair of diaphragm structures, and thus there is a possibility of an increased error in obtaining an amount of displacement of the contact part on the basis of the movement of the rotary motion mechanism and the movement of the axial motion mechanism. In other words, it is difficult to reduce a measurement error upon measuring an object W to be measured.

The present invention has been made in order to solve the above-described problems in the conventional technique, and an object thereof is to provide a measuring probe capable of achieving a reduced length in the axial direction and a reduced weight as well as reduced shape errors and improved measurement accuracy.

Solution to Problem

A first aspect of the present invention provides a measuring probe including: a stylus having a contact part to be in contact with an object to be measured; an axial motion mechanism having a moving member that allows the contact part to move in an axial direction; and a rotary motion mechanism having a rotating member that allows the contact part to move along a plane perpendicular to the axial direction by means of rotary motion. The measuring probe solves the above-described problems by configuring such that: the axial motion mechanism includes a plurality of first diaphragm structures that allow the moving member to be displaced, and the rotary motion mechanism includes a second diaphragm structure that allows the rotating member to be displaced; the second diaphragm structure is disposed between the plurality of first diaphragm structures in the axial direction; the number of the first diaphragm structures is set to an even number; and the respective first diaphragm structures are disposed at a symmetric distance with respect to the second diaphragm structure.

A second aspect of the present invention provides a measuring probe including: a stylus having a contact part to be in contact with an object to be measured; an axial motion mechanism having a moving member that allows the contact part to move in an axial direction; and a rotary motion mechanism having a rotating member that allows the contact part to move along a plane perpendicular to the axial direction by means of rotary motion. The measuring probe solves the above-described problems by configuring such that: the axial motion mechanism includes a plurality of first diaphragm structures that allow the moving member to be displaced, and the rotary motion mechanism includes a second diaphragm structure that allows the rotating member to be displaced; the second diaphragm structure is disposed between the plurality of first diaphragm structures in the axial direction; and when a particular type of the style is supported by the rotating member, the center of gravity of members supported by the second diaphragm structure coincides with a rotation center of the rotary motion mechanism.

A third aspect of the present invention provides the above-described measuring probe, wherein the number of the first diaphragm structures is set to an even number, and the respective first diaphragm structures are disposed at a symmetric distance with respect to the second diaphragm structure.

A fourth aspect of the present invention provides the above-described measuring probe, wherein the axial motion mechanism supports the rotary motion mechanism.

A fifth aspect of the present invention provides the above-described measuring probe, wherein the rotary motion mechanism supports the axial motion mechanism.

A sixth aspect of the present invention provides the above-described measuring probe, wherein the rotating member includes a balancing member on a side opposite to the stylus with respect to a rotation center of the rotary motion mechanism, and a distance between the rotation center and the balancing member is adjustable.

A seventh aspect of the present invention provides the above-described measuring probe including: a balance weight corresponding to mass of the stylus; and a counterbalance mechanism supported by an axial element housing member for supporting the axial motion mechanism, the counterbalance mechanism keeping the stylus and the balance weight in balance.

An eighth aspect of the present invention provides the above-described measuring probe including an axial element housing member that supports the axial motion mechanism, and wherein the axial element housing member is provided with a displacement detector for detecting displacement of the moving member.

A ninth aspect of the present invention provides the above-described measuring probe, wherein the displacement detector outputs a relative position detection signal that allows detection of a relative position of the moving member.

A tenth aspect of the present invention provides the above-described measuring probe, wherein the displacement detector outputs an absolute position detection signal that allows detection of an absolute position of the moving member.

An eleventh aspect of the present invention provides the above-described measuring probe, wherein the axial element housing member is provided with an interference optical system including an interference light source, a reference mirror for reflecting light from the interference light source, and a target mirror disposed in the moving member for reflecting light from the interference light source, the interference optical system capable of causing interference of reflected light from the reference mirror and the target mirror to generate a plurality of interference fringes, and the displacement detector can detect a phase shift of the plurality of interference fringes generated in the interference optical system.

A twelfth aspect of the present invention provides the above-described measuring probe including a preceding housing member that detachably couples and supports a housing member that supports both of the moving member and the rotating member with an engagement part capable of positioning the housing member, and wherein a reference member is provided on an end, opposite to the stylus, of any of the rotating member and a member supported by the rotating member, and an orientation detector for detecting displacement of the reference member corresponding to a rotary movement of the stylus is housed in the preceding housing member.

A thirteenth aspect of the present invention provides the above-described measuring probe, wherein a reference member is provided on an end, opposite to the stylus, of any of the rotating member and a member supported by the rotating member, and an orientation detector for detecting displacement of the reference member corresponding to a rotary movement of the stylus is housed in a housing member that supports both of the moving member and the rotating member.

A fourteenth aspect of the present invention provides the above-described measuring probe, wherein the reference member is a reflecting mirror for reflecting light, the measuring probe includes a light source for causing light to be incident on the reflecting mirror along an optical axis, and the orientation detector detects displacement of reflected light, reflected from the reflecting mirror, from the optical axis.

A fifteenth aspect of the present invention provides the above-described measuring probe, wherein the optical axis is provided so as to pass through the rotation center of the rotary motion mechanism.

A sixteenth aspect of the present invention provides the above-described measuring probe including a first limiting member for limiting an amount of deformation in the plurality of first diaphragm structures within a range of elastic deformation.

A seventeenth aspect of the present invention provides the above-described measuring probe including a second limiting member for limiting an amount of deformation in the second diaphragm structure within a range of elastic deformation.

An eighteenth aspect of the present invention provides the above-described measuring probe, wherein at least part of a gap between a first wall member, which is disposed so as to face the moving member and to be integral with the axial element housing member for supporting the axial motion mechanism, and the moving member, is filled with a first viscous material.

A nineteenth aspect of the present invention provides the above-described measuring probe, wherein at least part of a gap between a second wall member, which is disposed to be integral with a rotary element housing member for supporting the rotary motion mechanism, and any of the second diaphragm structure and the rotating member, is filled with a second viscous material.

In the present invention, it is possible to achieve a reduced length in the axial direction and a reduced weight as well as reduced shape errors and improved measurement accuracy. These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein:

FIG. 2A is a schematic diagram illustrating a cross section of the measuring probe according to the present embodiment, and FIG. 2B is a schematic diagram illustrating a cross section of a measuring probe according to a second embodiment, which is a variation of the present embodiment;

FIG. 6A is a schematic diagram illustrating a cross section of a measuring probe according to a fourth embodiment of the present invention taken along line (A)-(A) shifted from a central axis O in FIG. 6B, and FIG. 6B is a schematic diagram illustrating a cross section of a measuring probe according to the fourth embodiment of the present invention taken along the central axis O;

DESCRIPTION OF EMBODIMENTS

Embodiments of the present invention will be described below in detail with reference to the drawings.

The first embodiment according to the present invention will now be described with reference to FIGS. 1 to 4.

The general configuration of a measuring system 100 will be described first.

Figure 1:
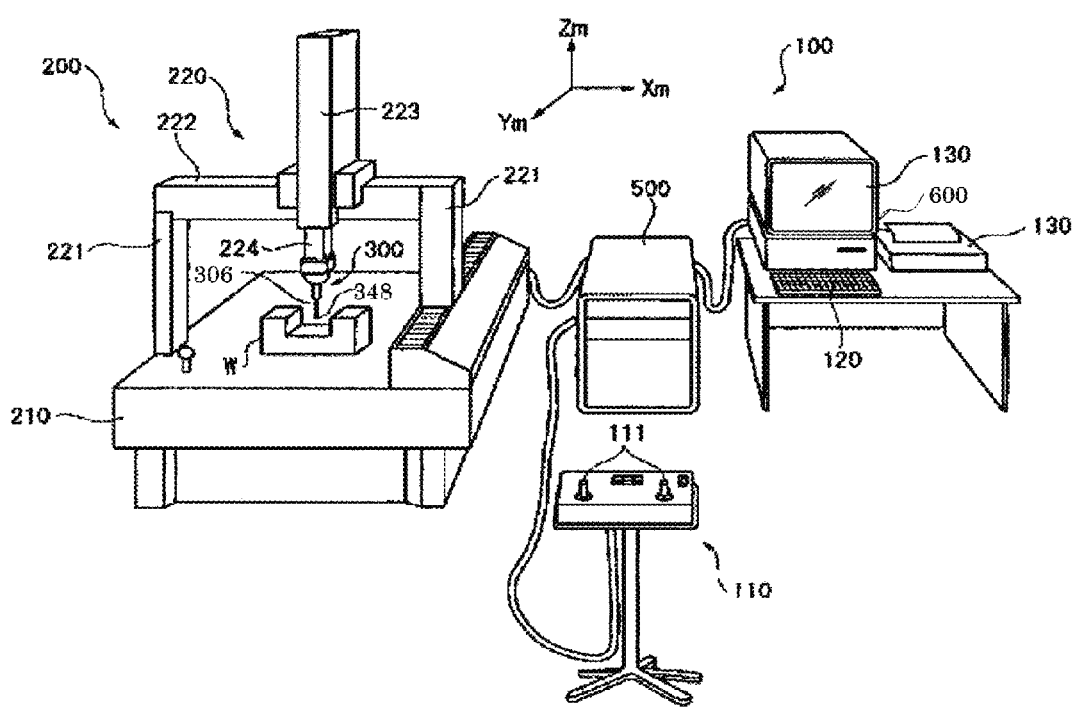
FIG. 1 is a schematic diagram illustrating an example of a measuring system that employs a measuring probe according to a first embodiment of the present invention.

As shown in FIG. 1, the measuring system 100 includes: a three-dimensional measuring machine 200 that moves a measuring probe 300; an operation part 110 having manually-operated joysticks 111; and a motion controller 500 that controls movements of the three-dimensional measuring machine 200. The measuring system 100 further includes: a host computer 600 that operates the three-dimensional measuring machine 200 via the motion controller 500 and processes measured data obtained by the three-dimensional measuring machine 200 to determine, for example, the dimension and shape of an object W to be measured; input unit 120 for inputting, for example, measurement conditions; and output unit 130 for outputting a result of measurement.

Components of the measuring system 100 will be described next.

As shown in FIG. 1, the three-dimensional measuring machine 200 includes: the measuring probe 300; a surface plate 210; a drive mechanism 220 provided to stand on the surface plate 210, for moving the measuring probe 300 three-dimensionally; and a drive sensor 230 that detects a drive amount of the drive mechanism 220.

As shown in FIG. 2A, the measuring probe 300 includes: a stylus 306; an axial motion mechanism 310; and a rotary motion mechanism 334. When coming into contact with a surface S of the object W to be measured, a contact part 348 of the stylus 306 can freely change its position in three directions along the shape of the surface S by means of the axial motion mechanism 310 and the rotary motion mechanism 334.

The general configuration of the measuring probe 300 will be further described with reference to FIG. 2A. Note that for the purpose of illustration, the longitudinal direction on the plane of paper in FIG. 2A is defined as a Z direction, the horizontal direction on the plane of the paper is defined as an X direction, and the perpendicular direction to the plane of the paper is defined as a Y direction. Thus, the direction of a central axis O (axial direction O) of the measuring probe 300 coincides with the Z direction.

As shown in FIG. 2A, the measuring probe 300 includes: the stylus 306 having the contact part 348 to be in contact with the object W to be measured; the axial motion mechanism 310 having a moving member 312 that allows the contact part 348 to move in the axial direction O; and the rotary motion mechanism 334 having a rotating member RP that allows the contact part 348 to move along the plane perpendicular to the axial direction O by means of rotary motion. The axial motion mechanism 310 and the rotary motion mechanism 334 are incorporated in a probe main body 302 and support the stylus 306. The supporting of the axial motion mechanism 310 by the rotary motion mechanism 334 in the probe main body 302 leads to the direct supporting of the stylus 306 by the moving member 312. A plurality of styluses 306 (having the contact parts 348 of different materials, at different positions, or with different mass, for example) are prepared.

The measuring probe 300 will be described below in detail.

Figure 3:
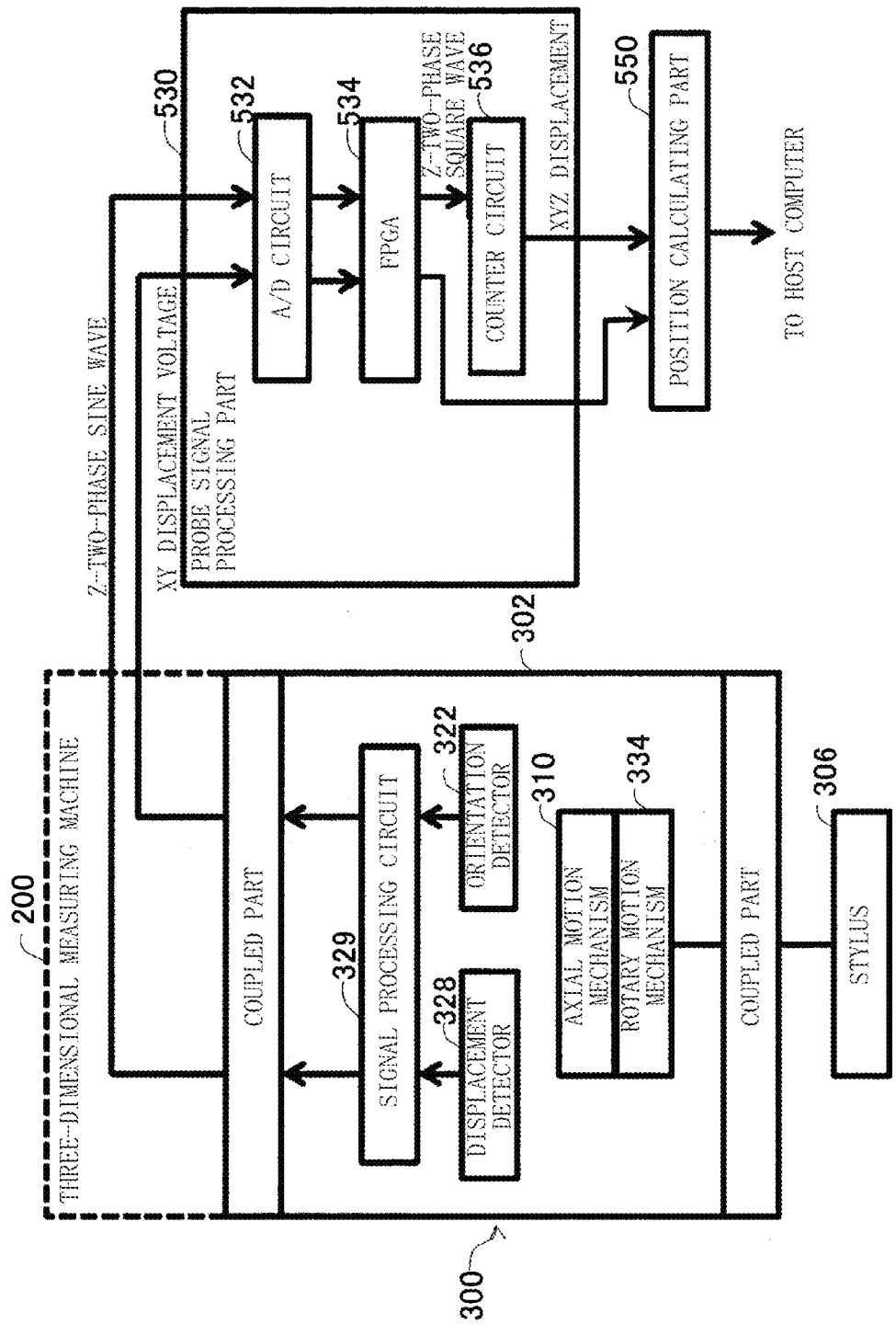
FIG. 3 is a block diagram illustrating a configuration of the measuring probe and peripherals thereof.

As shown in FIG. 2A, the probe main body 302 includes: a main body housing (rotary element housing member) 308; the rotary motion mechanism 334; the axial motion mechanism 310; an orientation detector 322; a displacement detector 326; and a signal processing circuit 329 (FIG. 3).

As shown in FIG. 2A, the main body housing 308 has a cylindrical shape with a cover and includes an opening 308A at a lower end thereof. The main body housing 308 supports and houses the rotary motion mechanism 334 radially inside thereof.

As shown in FIG. 2A, the rotary motion mechanism 334 includes: a rotating member 336 (RP); and a second diaphragm structure 340 that allows the rotating member 336 to be displaced with respect to the main body housing 308.

As shown in FIG. 2A, the rotating member 336 is a member supported by the second diaphragm structure 340. Except for a supporting part 336AA, the rotating member 336 has a generally hourglass shape symmetric about the second diaphragm structure 340 in the axial direction O. The rotating member 336 integrally includes: two ring portions 336A; two connecting portions 336B; two cylindrical portions 336C; and two joining portions 336D. The ring portion 336A has a ring shape. Peripheral portions of first diaphragm structures 314 and 315 (described later) are fixed to the ring portions 336A. The connecting portions 336B extend toward radially inside of the ring portions 336A so as to face the first diaphragm structures 314 and 315. Each of the cylindrical portions 336C has a hollow around its axial center. The cylindrical portions 336C are provided integrally with the connecting portions 336B. The two joining portions 336D are coupled to each other with the second diaphragm structure 340 interposed therebetween. More specifically, the second diaphragm structure 340 is disposed between the pair of first diaphragm structures 314 and 315 in the axial direction O, and the pair of first diaphragm structures 314 and 315 are disposed at a symmetric distance with respect to the second diaphragm structure 340 (note that a completely symmetric distance is not required but design or manufacturing errors, for example, are tolerated). Thus, the rotation center of the moving member 312 (described later), generated by the pair of first diaphragm structures 314 and 315, can be made coincident with the rotation center RC of the rotary motion mechanism 334. The supporting part 336AA extends from a part of the ring portion 336A in an area external to the axial direction O and supports the displacement detector 326.

Note that the character Lh denotes a distance between the first diaphragm structures 314 and 315 supported by the rotating member 336 as shown in FIG. 2A. The character Lw denotes a diameter of the inner peripheral surface of the ring portions 336A to which the first diaphragm structures 314 and 315 are fixed. In the present embodiment, the distance Lh is set to be greater than twice the diameter Lw (Lh>2*Lw). Thus, in an amount of displacement of the moving member 312 by the first diaphragm structures 314 and 315, a percentage of a movement component on a central axis of the rotating member 336 can be made greater than that of a rotation component with respect to the central axis of the rotating member 336. Thus, in the present embodiment, the unidirectional displacement accuracy of the moving member 312 can be enhanced (high rectilinear movement accuracy can be ensured) (the distance Lh is not limited thereto, but may be smaller than or equal to twice the diameter Lw). Note that such a relationship can be applied to all of the embodiments.

As shown in FIG. 2A, a distance between an outer side surface of the ring portion 336A and an inner side surface of the main body housing 308 is determined to regulate a tilt (displacement) of the rotating member 336 so that an amount of deformation in the second diaphragm structure 340 falls within the range of elastic deformation. In other words, it can be said that the probe main body 302 includes the main body housing 308 and the rotating member 336 together serving as a second limiting member for limiting an amount of deformation in the second diaphragm structure 340 within the range of elastic deformation.

Figure 4A:
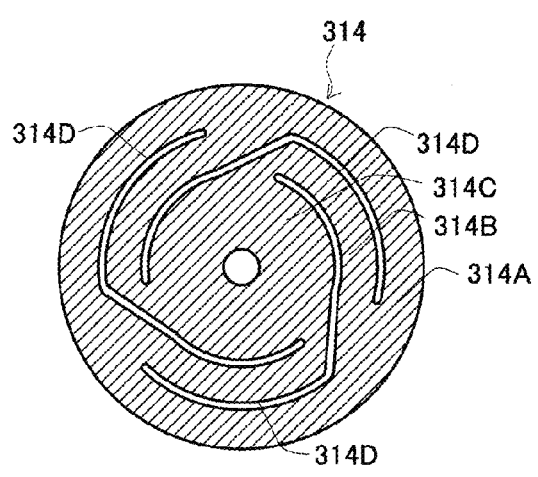
FIG. 4A is a schematic diagram illustrating an example of a first diaphragm structure used in an axial motion mechanism of the measuring probe.
Figure 4B:
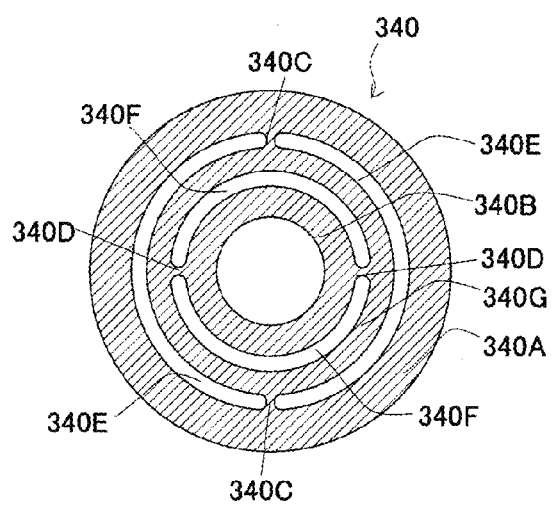
FIG. 4B is a schematic diagram illustrating an example of a second diaphragm structure used in a rotary motion mechanism of the measuring probe.

As shown in FIG. 4B, the second diaphragm structure 340 is an elastically-deformable member having a generally disk shape. An example of a material for the second diaphragm structure 340 is phosphor bronze (other materials may be used). The second diaphragm structure 340 is provided with two arc-shaped cutout portions 340E out of phase with each other by 180 degrees in the circumferential direction thereof, and two hinge portions 340C are formed therebetween. Two arc-shaped cutout portions 340F out of phase with each other by 180 degrees in the circumferential direction are further provided on a radially inner side of the cutout portions 340E and two hinge portions 340D are formed therebetween. Due to the cutout portions 340E and 340F, a peripheral portion 340A, a rim portion 340G, and a central portion 340B are provided from the outer side toward the inner side of the second diaphragm structure 340 in the radial direction.

As shown in FIG. 4B, the peripheral portion 340A is positioned at the outermost peripheral portion of the second diaphragm structure 340 and is a portion to be fixed to the main body housing 308. The rim portion 340G has a strip shape in the circumferential direction due to the cutout portions 340E and 340F provided on both sides thereof in the radial direction. The rim portion 340G is disposed on the inner side of the peripheral portion 340A. The rim portion 340G is connected to the peripheral portion 340A via the hinge portion 340C and connected to the central portion 340B via the hinge portion 340D. The central portion 340B is a portion for supporting the rotating member 336 and disposed on the inner side of the rim portion 340G. The cutout portions 340E and 340F are out of phase with each other by 90 degrees. Thus, the central portion 340B is tiltable (rotatable) in two directions with the center of the second diaphragm structure 340 (rotation center RC) used as an axis.

Figure 4C:
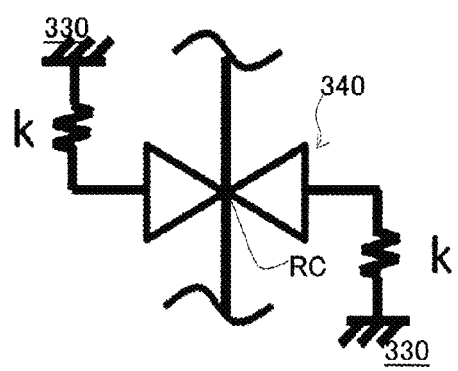
FIG. 4C is a functional diagram of the second diaphragm structure used in the rotary motion mechanism.

FIG. 4C is a schematic diagram illustrating a function of the second diaphragm structure 340. Note that the character k denotes a restoring force per unit displacement (angle) when the central portion 340B is displaced (rotated).

As shown in FIG. 2A, the axial motion mechanism 310 is supported radially inside of the rotating member (axial element housing member) 336. More specifically, the rotating member 336 and the axial motion mechanism 310 together constitute a linear motion module 304. As shown in FIG. 2A, the axial motion mechanism 310 includes: the moving member 312; and the pair of first diaphragm structures 314 and 315 that allows the moving member 312 to be displaced with respect to the rotating member 336.

As shown in FIG. 2A, the moving member 312 integrally includes: a coupling portion 312A; a rod portion 312B; a member disposed portion 312C; and a balancing member 338 from the lower part toward the upper part thereof in the Z direction (more specifically, the rotating member RP, which supports the moving member 312, has the balancing member 338 on a side opposite to the stylus 306 with respect to the rotation center RC of the rotary motion mechanism 334).

The balancing member 338 has mass corresponding to the mass of a particular stylus (a particular type of a stylus) 306. Appropriately setting this balancing member 338 (or adjusting a distance between the rotation center RC and the balancing member 338) allows the center of gravity of the members, including the stylus 306, supported by the rotating member RP to coincide with the rotation center RC. More specifically, when the particular stylus 306 is supported by the rotating member 336 via the moving member 312, the balancing member 338 causes the center of gravity of the members supported by the second diaphragm structure 340 to coincide with the rotation center RC of the rotary motion mechanism 334. This can prevent the central axis of the particular stylus 306 from greatly tilting from the axial direction O even when the measuring probe 300 is in the horizontal position, for example. More specifically, the stylus 306 can stay at the center in a measurement range of the orientation detector 322 (which will be described later) even when the orientation of the measuring probe 300 is changed. This allows the employment of a simpler, smaller, higher-resolution orientation detector 322. Note that the particular stylus 306 in the present embodiment refers to a stylus assumed to be most frequently attached to the measuring probe 300 of the present embodiment. The "members supported by the second diaphragm structure 340" include the rotating member 336, the axial motion mechanism 310, a reference member 316, a flange member 342, and the stylus 306. The member disposed portion 312C is formed below the balancing member 338 and a reference member 324 is disposed on a side surface of the member disposed portion 312C. The rod portion 312B is formed below the member disposed portion 312C and disposed between the pair of first diaphragm structures 314 and 315. The rod portion 312B is housed in the rotating member 336. The coupling portion 312A is formed below the rod portion 312B. The flange member 342 is attached to a lower end of the coupling portion 312A.

As shown in FIG. 2A, a diameter of the opening 308A of the main body housing 308 is set to be smaller than an outer diameter of the flange member 342. A distance between an upper end 342C of the flange member 342 and a lower end 308AB of the opening 308A is determined to regulate upward displacement of the flange member 342 in the Z direction so that an amount of deformation in the pair of first diaphragm structures 314 and 315 falls within the range of elastic deformation. In other words, it can be said that the probe main body 302 includes the main body housing 308 and the flange member 342 together serving as a first limiting member for limiting an amount of deformation in the pair of first diaphragm structures 314 and 315 within the range of elastic deformation.

As shown in FIG. 2A, the displacement detector 326 disposed on the supporting part 336AA faces the reference member 324 disposed on the member disposed portion 312C to detect reflected light from the reference member 324. The displacement detector 326 incorporates a light source (not shown) for emitting light to the reference member 324. Incremental patterns having different reflectances for light from the light source are provided at predetermined intervals in the axial direction O on a surface of the reference member 324 closer to the displacement detector 326. In other words, the reference member 324 is a reflective solid-state scale. The reference member 324, the displacement detector 326, and the light source together constitute a photoelectric incremental linear encoder that outputs a two-phase sinusoidal signal. More specifically, the rotating member 336 is provided with the displacement detector 326 for detecting displacement of the moving member 312. Corresponding to the displacement of the moving member 312, the displacement detector 326 outputs a periodic signal repeated in predetermined cycles of the incremental patterns (i.e., the displacement detector 326 is configured to output a relative position detection signal that allows detection of the relative position of the moving member 312). This periodic signal is wave-shaped by the signal processing circuit 329. A Z-two-phase sine wave for obtaining displacement of the reference member 324 in the Z direction is outputted from the signal processing circuit 329.

FIG. 2B is a schematic diagram illustrating the second embodiment, which is a variation of the reference member 324 and the displacement detector 326 in the first embodiment. Here, displacement of a moving member 362 is detected by a differential transformer transducer. Specifically, a reference member 374 provided in the moving member 362 is a cylindrical metal member. A displacement detector 376 has a cylindrical shape and is disposed so as to be in proximity to and face the reference member 374. The displacement detector 376 is configured by: an exciting coil that oscillates at a high frequency (e.g., a sinusoidal voltage of 1 kHz or greater is used); and a set of differential-coupled receiving coils disposed so as to interpose the exciting coil therebetween. The receiving coils can detect unidirectional displacement (absolute position) of the reference member 374 with respect to a rotating member 386. More specifically, the displacement detector 376 is configured to output an absolute position detection signal that allows the detection of the absolute position of the moving member 362. Since the differential transformer transducer is employed to detect the unidirectional displacement (absolute position) with respect to the rotating member 386, the absolute position of a contact part 398 in the axial direction O can be easily calculated. A supporting part 386AA has a cylindrical shape and supports the displacement detector 376 radially inside thereof. The other elements are similar to those in the present embodiment. Thus, basically the first two digits of their reference numerals are simply changed from the present embodiment and the description thereof will be omitted.

As shown in FIG. 4A, each of the first diaphragm structures 314 and 315 is an elastically-deformable member having a generally disk shape. An example of a material for the first diaphragm structures 314 and 315 is phosphor bronze (other materials may be used). Here, the first diaphragm structure 314 is identical with the first diaphragm structure 315 (without being limited thereto, the first diaphragm structures 314 and 315 may have shapes different from each other). Thus, only the first diaphragm structure 314 will be described with reference to FIG. 4A.

As shown in FIG. 4A, the first diaphragm structure 314 is provided with three cutout portions 314D out of phase with one another by 120 degrees in the circumferential direction thereof. Due to the cutout portions 314D, a peripheral portion 314A, a rim portion 314B, and a central portion 314C are provided from the outer side toward the inner side of the first diaphragm structure 314 in the radial direction. The peripheral portion 314A is positioned at the outermost peripheral portion of the first diaphragm structure 314 and is a portion to be fixed to the main body housing 308. The rim portion 314B has a strip shape in the circumferential direction due to the two adjacent cutout portions 314D and is disposed on the inner side of the peripheral portion 314A. Opposite ends of the rim portion 314B are coupled to the peripheral portion 314A and the central portion 314C, respectively. The central portion 314C is a portion for supporting the moving member 312 and disposed on the inner side of the rim portion 314B. Displacement of the moving member 312 with respect to the rotating member 336 causes the central portion 314C of the first diaphragm structure 314 to move in a vertical direction and causes the rim portion 314B to be elastically deformed. Note that the configuration of the first diaphragm structure is not limited to the shape described in the present embodiment (this applies also to the second diaphragm structure).

As shown in FIG. 2A, another light source 318 is provided on the inner side surface of the main body housing 308. A beam splitter 320 that directs light outputted from the light source 318 in the Z direction is supported by a supporting member (note that the supporting member is fixed to the inner side of the main body housing 308). The light directed in the Z direction (light passing through an optical axis OA) is reflected by the reference member 316 (which is a reflecting mirror for reflecting light) provided above the balancing member 338 of the moving member 312, i.e., provided on an end, opposite to the stylus 306, of the member supported by the rotating member RP (i.e., the probe main body 302 is provided with the light source 318 for causing light to be incident on the reference member 316 along the optical axis OA). The reflected light passes through the beam splitter 320 and the orientation detector 322 disposed on an inner upper surface of the main body housing 308 (i.e., the orientation detector 322 is housed in the main body housing 308 which supports both of the moving member 312 and the rotating member 336) detects the light reflected from the reference member 316. Thus, displacement (tilt) of the reference member 316 changes the position of the reflected light detected by the orientation detector 322. This allows the orientation detector 322 to detect the displacement of the reflected light, which is reflected from the reference member 316, from the optical axis OA. Thus, the orientation detector 322 can detect the displacement (tilt) of the reference member 316 corresponding to the rotary movement of the stylus 306. The optical axis OA is provided so as to pass through the rotation center RC of the rotary motion mechanism 334 (i.e., the central axis O coincides with the optical axis OA).

As shown in FIG. 2A, the reference member 316 has a concave surface so as to reduce an amount of displacement from the optical axis OA in the reflected light detected by the orientation detector 322 and thus achieve the miniaturization of the orientation detector 322. An output from the orientation detector 322 is also inputted to the signal processing circuit 329. The output from the orientation detector 322 is then wave-shaped by the signal processing circuit 329. A displacement voltage (XY displacement voltage) based on the displacement of the reflected light in the XY direction from the optical axis OA, which is caused by the change in the orientation of the reference member 316, is outputted from the signal processing circuit 329.

As shown in FIG. 2A, the diameter of the opening 308A of the main body housing 308 is set to be smaller than the outer diameter of the flange member 342. A distance between the upper end 342C of the flange member 342 and the lower end 308AB of the opening 308A is determined to regulate upward displacement of the flange member 342 in the Z direction so that an amount of deformation in the pair of first diaphragm structures 314 and 315 falls within the range of elastic deformation. In other words, it can be said that the probe main body 302 includes the main body housing 308 and the flange member 342 together serving as a first limiting member for limiting an amount of deformation in the pair of first diaphragm structures 314 and 315 within the range of elastic deformation.

As shown in FIG. 2A, along a periphery on a lower end of the flange member 342, one pair of rollers 342A is provided at each of positions at intervals of 120 degrees in the circumferential direction thereof, i.e., totally three pairs of rollers 342A are provided at intervals of 120 degrees in the circumferential direction thereof. A permanent magnet 342B is provided on the central axis O. Note that the axial direction of the pair of rollers 342A coincides with an approximately radial direction toward the center of the flange member 342.

As shown in FIG. 2A, the stylus 306 includes: a flange part 344; a rod part 346; and the contact part 348.

As shown in FIG. 2A, the flange part 344 is a member corresponding to the flange member 342. More specifically, three balls 344A are disposed at intervals of 120 degrees in the circumferential direction of the flange part 344 so as to be each in contact with the pair of rollers 342A. A magnetic member 344B (which may be a permanent magnet) to be attracted to the permanent magnet 342B is disposed in the flange part 344 to correspond to the permanent magnet 342B.

As shown in FIG. 2A, the three balls 344A are each in contact with the surfaces of the corresponding pair of rollers 342A. Thus, in a state where the permanent magnet 342B and the magnetic member 344B are being attracted to each other by a predetermined force, the flange member 342 is seated on (in contact with) the flange part 344 at six points. In other words, the flange member 342 and the flange part 344 can be coupled to each other while achieving high positioning accuracy. More specifically, the flange part 344 and the flange member 342 together constitute a kinematic joint, which is a detachable coupling mechanism (it is referred to also as a kinematic coupling). Such a kinematic joint allows for a high degree of positioning reproducibility even when attachment and detachment between the stylus 306 and the flange member 342 are repeatedly performed. Note that the kinematic joint may be a combination of V-grooves and balls without being limited to the combination of the rollers and the balls. While employing the combination of the rollers and the balls, the order of their arrangement may be reversed. In other words, the present invention is not limited to the combination of the rollers and the balls as long as seating at six points can be achieved. When a large force is applied to the stylus 306 from a lateral direction (direction perpendicular to the axial direction O), the stylus 306 can drop off from the flange member 342 (including not only a case where no balls 344A are in contact with the rollers 342A but also a case where a part of the balls 344A is not in contact with the corresponding rollers 342A) to prevent the breakage of the probe main body 302 (therefore, the predetermined attracting force between the permanent magnet 342B and the magnetic member 344B is set to be a force corresponding to the aforementioned large force; the same applies hereinafter).

As shown in FIG. 2A, a base end of the rod part 346 is attached to the flange part 344. A tip of the rod part 346 is provided with the spherical contact part 348. Note that when no displacement in the XY direction occurs in the stylus 306, the direction of the central axis of the stylus 306 coincides with the Z direction (axial direction O).

A probe signal processing part 530 will next be described with reference to FIG. 3.

As shown in FIG. 3, the probe signal processing part 530 includes: an analog-to-digital (A/D) circuit 532; an FPGA 534; and a counter circuit 536. The A/D circuit 532 performs analog-to-digital conversion of the Z-two-phase sine wave and the XY displacement voltage, which are inputted analog signals, in order to obtain respective digital signals thereof. More specifically, as the number of bits in this analog-to-digital conversion increases, a higher dynamic range and higher sensitivity to the displacement of the stylus 306 can be achieved. The FPGA 534 converts the XY displacement voltage, which is a digital signal, into a displacement signal and outputs the signal to a position calculating part 550. The FPGA 534 also converts the Z-two-phase sine wave, which is a digital signal, into a Z-two-phase square wave and outputs the Z-two-phase square wave to the counter circuit 536. The counter circuit 536 measures the Z-two-phase square wave to obtain the displacement in the Z direction and outputs the obtained result to the position calculating part 550.

In the present embodiment, the second diaphragm structure 340 is disposed between the pair of first diaphragm structures 314 and 315 in the axial direction O. Thus, despite that the axial motion mechanism 310 and the rotary motion mechanism 334 are connected in series in the axial direction O, the length of a suspension mechanism configured by the axial motion mechanism 310 and the rotary motion mechanism 334 in the axial direction O can be made shorter than the simple addition of the lengths of the axial motion mechanism 310 and the rotary motion mechanism 334 in the axial direction O. Note that the present invention is not limited thereto. A plurality of first diaphragm structures may be provided without constituting such a pair.

In the present embodiment, when the particular stylus 306 is supported by the rotating member 336, the center of gravity of the members supported by the second diaphragm structure 340 coincides with the rotation center RC of the rotary motion mechanism 334. This can prevent the central axis of the stylus 306 from tilting from the axial direction O even when the measuring probe 300 is in the horizontal position, for example.

Furthermore, in the present embodiment, the pair of first diaphragm structures 314 and 315 are disposed at a symmetric distance with respect to the second diaphragm structure 340 (i.e., the rotation center RC coincides with a midpoint between the pair of first diaphragm structures 314 and 315). This enables the configuration of the balanced suspension mechanism, the prevention of unintended deformation in the suspension mechanism (e.g., the prevention of the rotation of the axial motion mechanism 310 at a position different from the rotation center RC), and improved accuracy of the measuring probe 300. At the same time, even when the central axis of the stylus 306 is tilted with respect to the axial direction O, for example, such a tilt has no influence on the rectilinear movement accuracy of the stylus 306 (moving member 312). Thus, a change in measurement accuracy can be prevented from occurring. Note that the present invention is not limited thereto. A pair of first diaphragm structures may not be disposed at a symmetric distance with respect to the second diaphragm structure. Alternatively, even-numbered (such as 4, excluding 2) first diaphragm structures may be provided, and those first diaphragm structures may be disposed at symmetric positions with respect to the second diaphragm structure.

In the present embodiment, in order to change the position of the stylus 306 in the XYZ direction, the axial motion mechanism 310 performs a movement in the Z direction and the rotary motion mechanism 334 performs a movement in the XY direction in principle. Thus, the displacement of the stylus 306 can be separated into components of the Z direction and the XY direction, thereby allowing displacements in the Z direction and the XY direction to be easily detected independently of each other. The position calculation can be therefore simplified. Also, detection sensitivity in the Z direction and that in the XY direction can be set independently of each other.

In the present embodiment, the axial motion mechanism 310 is supported by the pair of identical first diaphragm structures 314 and 315. Thus, occurrence of the displacement of the axial motion mechanism 310 in a direction other than the Z direction can be reduced, thus ensuring high movement accuracy in the Z direction. Also, increased responsivity can be achieved when compared with a case where an air bearing, or the like, is concurrently used for the guiding of the moving member.

In the present embodiment, the supporting of the rotating member 336 (which supports the axial motion mechanism 310) by the rotary motion mechanism 334 leads to the direct supporting of the stylus 306 by the moving member 312. Thus, when compared with a case where the axial motion mechanism supports the moving member (which supports the rotary motion mechanism), the mass of the members supported by the moving member 312 can be reduced, thereby facilitating the optimization of the restoring force of the pair of first diaphragm structures 314 and 315. Consequently, displacement of the stylus 306 in the axial direction O by the axial motion mechanism 310 can be detected with high sensitivity. At the same time, the responsivity of the axial motion mechanism 310 can be improved.

In the present embodiment, the rotating member 336 that supports the axial motion mechanism 310 is provided with the displacement detector 326 for detecting displacement of the moving member 312. More specifically, the displacement detector 326 is supported also by the rotating member 336 and detects displacement of the moving member 312 capable of moving in the axial direction O of the stylus 306 without moving in the XY direction in principle. Thus, the displacement detector 326, even if it is not an expensive detector, can detect the displacement of the moving member 312 with a high resolution and can easily correct the displacement of the moving member 312. Also, a linear encoder, or the like, can be easily employed and the moving member 312 (i.e., the stylus 306) can have a long stroke. Note that the present invention is not limited thereto. The displacement detector may be provided in the main body housing.

In the present embodiment, the displacement detector 326 outputs a relative position detection signal (a periodic signal repeated in predetermined cycles) that allows the detection of the relative position of the moving member 312. Thus, constituting a photoelectric incremental linear encoder with the displacement detector 326 allows the avoidance of a phenomenon in which detection sensitivity varies according to a position to which the moving member 312 is moved while ensuring an extremely long detection range (dynamic range). Also, subjecting the relative position detection signal to analog-to-digital conversion with high bit number allows the detection of the position in the axial direction O with a higher resolution. Note that the present invention is not limited thereto. The displacement detector may be configured to detect not an incremental pattern but an absolute pattern. In other words, the displacement detector may be configured to output an absolute position detection signal that allows the detection of the absolute position of the moving member.

In the present embodiment, the reference member 316 is provided on an end, opposite to the stylus 306, of the balancing member 338 (provided in the moving member 312) supported by the rotating member 336, and the orientation detector 322 for detecting displacement of the reference member 316 corresponding to a rotary movement of the stylus 306 is housed in the main body housing 308. Thus, since a distance between the reference member 316 and the orientation detector 322 can be reduced, the measuring probe 300 can be downsized and a cost reduction can be therefore achieved. At the same time, a calculation error of the displacement of the contact part 348, which is calculated from the displacement of the reference member 316, can be reduced and thus the position of the contact part 348 can be obtained with high accuracy. Also, since no orientation detector 322 is provided in the linear motion module 304, the linear motion module 304 itself can be downsized and a cost reduction thereof can be therefore achieved.

In the present embodiment, the light source 318 that causes light to be incident on a reflecting mirror, or the reference member 316, along the optical axis OA is provided, and the orientation detector 322 detects the displacement of the reflected light, which is reflected from the reflecting mirror, from the optical axis OA. More specifically, since the orientation detector 322 performs detection in a contactless manner, the orientation detector 322 can detect the displacement of the reference member 316 corresponding to the displacement of the rotating member 336 with high sensitivity without inhibiting the rotary motion of the rotating member 336. Also, since the configuration for detecting the displacement of the reference member 316 is an optical lever and therefore simple, a cost reduction of the measuring probe 300 can be achieved. Note that the orientation detector is not limited thereto. A contact type orientation detector or a contactless type orientation detector utilizing magnetism, for example, may be employed.

In the present embodiment, the optical axis OA is provided so as to pass through the rotation center RC. Thus, a change in reflected light generated by the rotary movement of the rotating member 336 (RP) contains no displacement component in the Z direction, and the displacement of the reference member 316 can be therefore detected with higher sensitivity. Note that the present invention is not limited thereto. The optical axis OA may be configured so as not to pass through the rotation center RC.

In the present embodiment, the probe main body 302 includes the main body housing 308 and the rotating member 336, which are for limiting an amount of deformation in the second diaphragm structure 340 within the range of elastic deformation. Also, the probe main body 302 includes the main body housing 308 and the flange member 342, which are for limiting an amount of deformation in the pair of first diaphragm structures 314 and 315 within the range of elastic deformation. Thus, even when excessively large impact is applied to the stylus 306 in a direction along which the kinematic joint cannot function, for example, plastic deformation, breakage, or breakdown of the pair of first diaphragm structures 314 and 315 and the second diaphragm structure 340 can be prevented from occurring. Note that the present invention is not limited thereto. The measuring probe may not include the configuration for limiting an amount of deformation in the pair of first diaphragm structures and the second diaphragm structure within the range of elastic deformation.

In other words, in the present embodiment, the measuring probe can have a reduced length in the axial direction O and a reduced weight and achieve reduced shape errors and improved measurement accuracy.

Although the present invention has been described with reference to the above embodiment, the present invention is not limited thereto. In other words, modifications and design alterations can be made without departing from the scope of the present invention.

Although the supporting of the axial motion mechanism by the rotary motion mechanism leads to the direct supporting of the stylus by the moving member in the above-described embodiments, the present invention is not limited thereto. For example, the present invention may be configured as in the third embodiment shown in FIG. 5. The third embodiment is different from the above-described embodiments mainly in supporting relationship between a rotary motion mechanism and an axial motion mechanism. Thus, for components excluding those different from the above-described embodiments, basically the first two digits of their reference numerals are simply changed from the above-described embodiments and the description thereof will be omitted.

Figure 5:
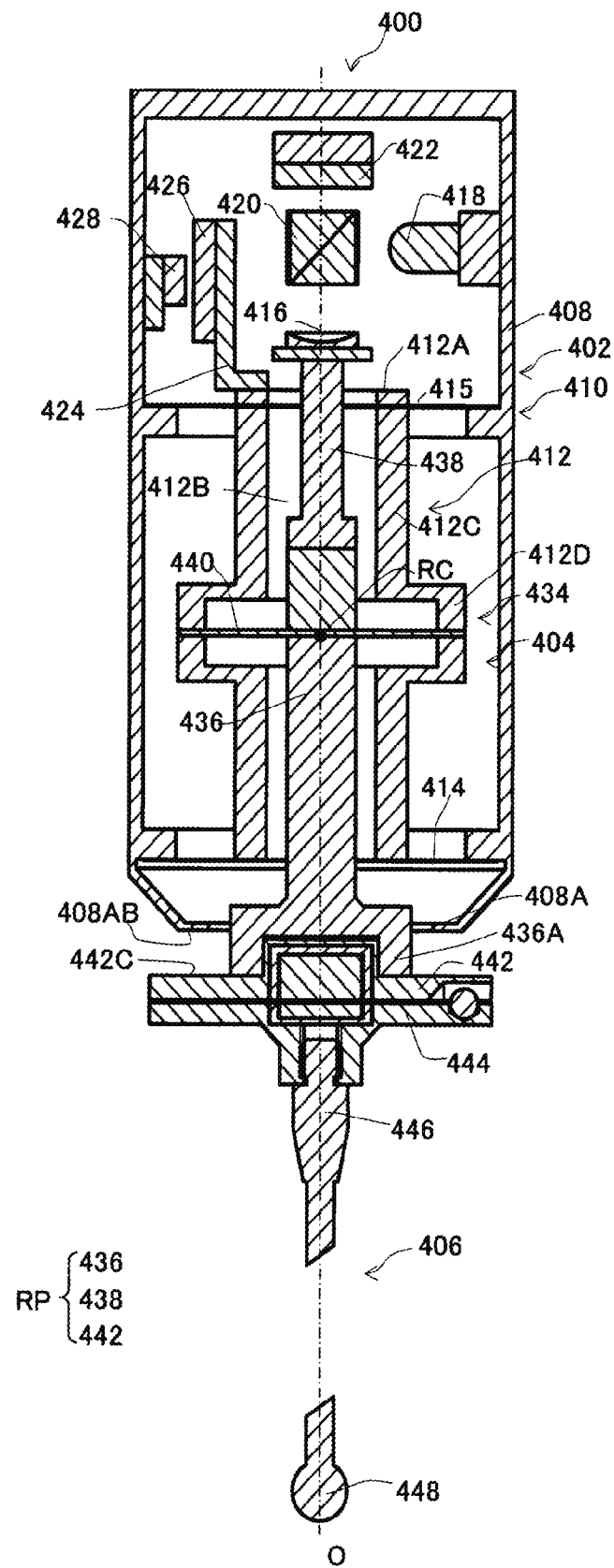
FIG. 5 is a schematic diagram illustrating a cross section of a measuring probe according to a third embodiment of the present invention.

In the third embodiment, the supporting of a rotary motion mechanism 434 by an axial motion mechanism 410 leads to the direct supporting of a stylus 406 by a rotating member RP as shown in FIG. 5. In other words, a main body housing (axial element housing member) 408 supports the axial motion mechanism 410. Thus, a displacement detector 428 is supported on an inner side surface of the main body housing 408. The moving member 412 has a cylindrical shape symmetric with respect to a second diaphragm structure 440 in the axial direction O.

Specifically, the moving member 412 integrally includes two cylindrical portions 412C and two joining portions 412D as shown in FIG. 5. Central portions of first diaphragm structures 414 and 415 are fixed to the vicinities of outer edges of the two cylindrical portions 412C. An inner diameter of the two joining portions 412D is set to be greater than an inner diameter of a hollow portion 412B of the cylindrical portion 412C. The two joining portions 412D are coupled to each other with the second diaphragm structure 440 interposed therebetween. Therefore, also in the present embodiment, the pair of first diaphragm structures 414 and 415 are disposed at a symmetric distance with respect to the second diaphragm structure 440 in the axial direction O.

As shown in FIG. 5, a scale bracket 424 is disposed on an upper end 412A of the moving member 412. A reference member 426, which is a scale, is disposed on the scale bracket 424. The displacement detector 428 that detects reflected light from the reference member 426 is disposed to face the reference member 426. More specifically, also in the present embodiment, the reference member 426 and the displacement detector 428 constitute a photoelectric incremental linear encoder (which may be a photoelectric absolute linear encoder) that outputs a two-phase sinusoidal signal.

As shown in FIG. 5, the rotary motion mechanism 434 is supported radially inside of the moving member 412. More specifically, the moving member 412 and the rotary motion mechanism 434 together constitute a rotary module 404. The rotating member RP is configured by an upper member 436, a balancing member 438, and a flange member 442. An upper end of the balancing member 438 protrudes from the upper end 412A of the moving member 412 and a reference member 416 is formed thereon. In other words, in the present embodiment, the reference member 416 is provided on an end of the rotating member RP opposite to the stylus 406 (note that the relationship between the reference member 416 and an orientation detector 422 is the same as that in the above embodiment).

In the present embodiment, the mass of the member supported by the rotating member RP can be reduced and displacement of the stylus 406 in the XY direction by the rotary motion mechanism 434 can be detected with high sensitivity when compared with a case where the rotary motion mechanism supports the axial motion mechanism.

As shown in FIG. 5, in the present embodiment, a diameter of an opening 408A of the main body housing 408 is set to be smaller than an outer diameter of the flange member 442. A distance between an upper end 442C of the flange member 442 and a lower end 408AB of the opening 408A is determined to regulate upward displacement of the flange member 442 in the Z direction so that an amount of deformation in the pair of first diaphragm structures 414 and 415 falls within the range of elastic deformation. In other words, it can be said that a probe main body 402 includes the main body housing 408 and the flange member 442 together serving as a first limiting member for limiting an amount of deformation in the pair of first diaphragm structures 414 and 415 within the range of elastic deformation.

Although the displacement detector 428 constitutes a photoelectric incremental linear encoder in the third embodiment, the present invention is not limited thereto. For example, the present invention may be configured as in the fourth embodiment shown in FIGS. 6A and 6B. The fourth embodiment is different from the third embodiment in a configuration around a displacement detector, and thus, for components excluding those around the displacement detector, basically the first two digits of their reference numerals are simply changed from the third embodiment and the description thereof will be omitted.

Figure 7A:
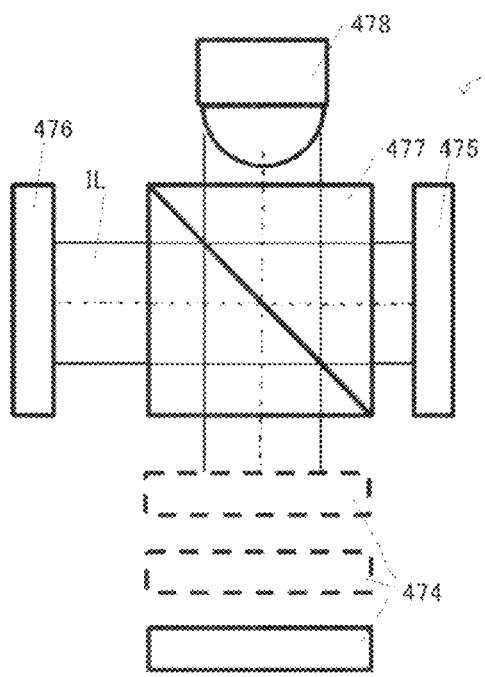
FIG. 7A is a schematic diagram illustrating arrangement of components in an interference optical system according to the fourth embodiment of the present invention.

In the fourth embodiment, as shown in FIGS. 6A, 6B, and 7A, a probe main body 452 is provided with an interference optical system IF including: a light source (interference light source) 478; a reference mirror 475 for reflecting light from the light source 478; and a reference member (target mirror) 474 disposed in a moving member 462 for reflecting light from the light source 478. The interference optical system IF is capable of causing the interference of the reflected light from the reference mirror 475 and the reference member 474 to generate a plurality of interference fringes IL. The light source 478 and the reference mirror 475 are fixed to the inner side of a main body housing 458. The light source 478 and the reference member 474 disposed on an upper end 462A of the moving member 462 are aligned in the Z direction and a beam splitter 477 is disposed therebetween. The beam splitter 477 is also fixed to the inner side of the main body housing 458. These elements together constitute a Michelson interference optical system IF.

Figure 7B:
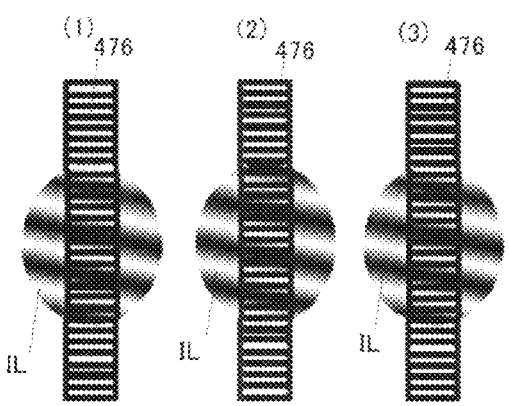
FIG. 7B shows how interfering light is incident on a displacement detector in the interference optical system according to the fourth embodiment of the present invention.

As shown in FIGS. 6A, 6B, and 7A, the beam splitter 477 causes light from the light source 478 to split in a direction toward the reference mirror 475. The beam splitter 477 also guides reflected light, which is reflected by the reference member 474, to a displacement detector 476 facing the reference mirror 475 and the beam splitter 477. Simultaneously, light reflected by the reference mirror 475 and passed through the beam splitter 477 is incident on the displacement detector 476. Thus, the displacement detector 476 can detect phase shifts PS of the plurality of interference fringes IL generated by the interference optical system IF as shown in FIG. 7B.

Figure 7C:
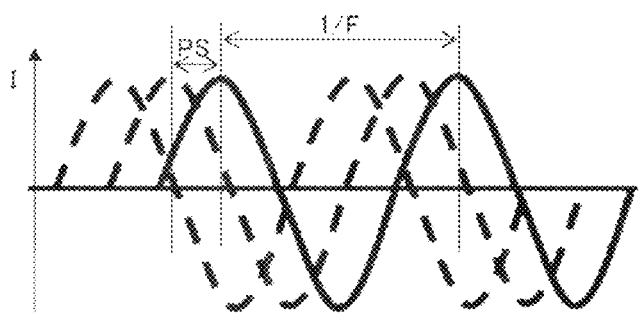
FIG. 7C is a chart showing phases and frequencies of interfering light detected by the displacement detector in the interference optical system according to the fourth embodiment of the present invention.

FIG. 7C shows light intensity I of the plurality of interference fringes IL detected by the displacement detector 476. Here, the phase shift PS reflects the amount of movement of the reference member 474 in the Z direction. Thus, an amount of displacement of the moving member 462 in the Z direction can be obtained by obtaining the phase shift PS. Here, since the plurality of interference fringes IL are constituted by interfering light and periodic, the phase shift PS can be obtained with high accuracy (it can be said also in the present embodiment that the displacement detector 476 is configured to output a relative position detection signal that allows the detection of the relative position of the moving member 462).

Thus, in the present embodiment, the displacement of the moving member 462 in the Z direction can be obtained more accurately than in the above embodiment. Also, a period 1/F of the light intensity I for the plurality of interference fringes IL reflects a tilt of the reference member 474. Thus, a slight tilt of the moving member 462 in the XY direction can be obtained by obtaining a change in the period 1/F. In the present embodiment, since the slight tilt of the moving member 462 in the XY direction, which is associated with the displacement of the moving member 462 in the Z direction, can also be obtained from the output of the displacement detector 476, the displacement of a contact part 498 in the XY direction can be obtained with higher accuracy. Note that the interference optical system IF of the present embodiment is not the only system capable of obtaining a tilt of the moving member 462 in the XY direction. In principle, the displacement detectors described in the other embodiments can also obtain such a tilt in the XY direction. Moreover, the present embodiment is based on the assumption that only one wavelength is employed. If two or more wavelengths are employed, however, the displacement detector can output an absolute position detection signal that allows the detection of the absolute position of the moving member.

In the present embodiment, an orientation detector 472 is disposed on an inner upper surface of the main body housing 458 on the central axis O as shown in FIGS. 6A and 6B. Thus, the reference member 474, the reference mirror 475, the beam splitter 477, and the light source 478 together constituting the interference optical system IF and an optical path for the displacement detector 476 are provided at positions shown in FIG. 6B, which are shifted in the X direction from the central axis O. In the present embodiment, a flange member 492 is provided with V-grooves, instead of rollers, for positioning with a stylus 456.

In the first embodiment, when the stylus 306 to be employed is changed, the moving member is allowed to change its position in the axial direction O according to the mass of the stylus 306. However, the present invention is not limited thereto. For example, the present invention may be configured as in the fifth embodiment shown in FIG. 8A. The fifth embodiment is different from the first embodiment mainly in a coupling state between a linear motion module and a stylus. Thus, for components excluding those associated with the linear motion module and the stylus, basically the first two digits of their reference numerals are simply changed from the first embodiment and the description thereof will be omitted.

Figure 8A:
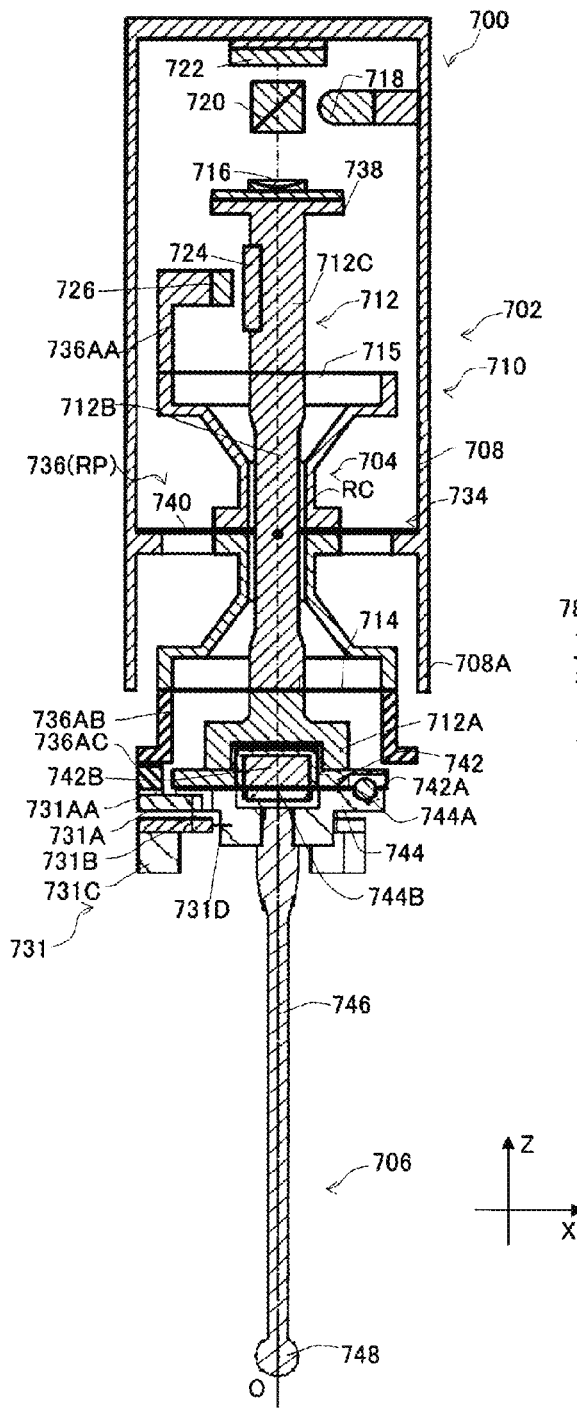
FIG. 8A is a schematic diagram illustrating a cross section of a measuring probe according to a fifth embodiment of the present invention.

In the fifth embodiment, a stylus 706 includes: balance weights 731C corresponding to the mass of the stylus 706; and counterbalance mechanisms 731 as shown in FIG. 8A. The counterbalance mechanisms 731 are supported by a rotating member (axial element housing member) 736 for supporting the axial motion mechanism 710 and configured to keep the stylus 706 and the balance weights 731C in balance in the Z direction. The counterbalance mechanisms 731 are detachable together with the stylus 706 from the probe main body 702.

Specifically, the rotating member 736 includes a cylindrical supporting part 736AB extended downwardly in the Z direction as shown in FIG. 8A. Three or more permanent magnets 736AC are provided at equal intervals in the circumferential direction on a lower end of the supporting part 736AB.

On the other hand, three or more counterbalance mechanisms 731 are provided in a flange part 744 of the stylus 706 so as to correspond to the positions and number of the permanent magnets 736AC as shown in FIGS. 8A and 9A to 9C. The counterbalance mechanism 731 includes: a supporting member 731A; a support shaft 731B; and a coupling shaft 731D. A magnetic member (which may be a magnet) 731AA attractable to the permanent magnet 736AC is provided on an upper surface of the supporting member 731A. The support shaft 731B is fixed to the supporting member 731A and the balance weight 731C is eccentrically coupled to the support shaft 731B. The balance weight 731C is provided with the coupling shaft 731D in the direction perpendicular to the Z direction, and a tip of the coupling shaft 731D is coupled to the flange part 744.

Thus, in the present embodiment, when the stylus 706 is replaced for a single probe main body 702, the balance weights 731C corresponding to the mass of the changed stylus 706 are necessarily used. This allows the rotating member 736 to directly receive an increase or decrease in the mass of the stylus 706. More specifically, fluctuations in the initial position of a moving member 712 in the Z direction due to different styluses 706 can be prevented by this configuration. In the present embodiment, a range of motion for the moving member 712 can be reduced when compared with the above embodiment, thus allowing further miniaturization of a linear motion module 704. At the same time, the detection range (dynamic range) can also be reduced, thus allowing the detection of an amount of displacement of the moving member 712 with a higher resolution.

Figure 8B:
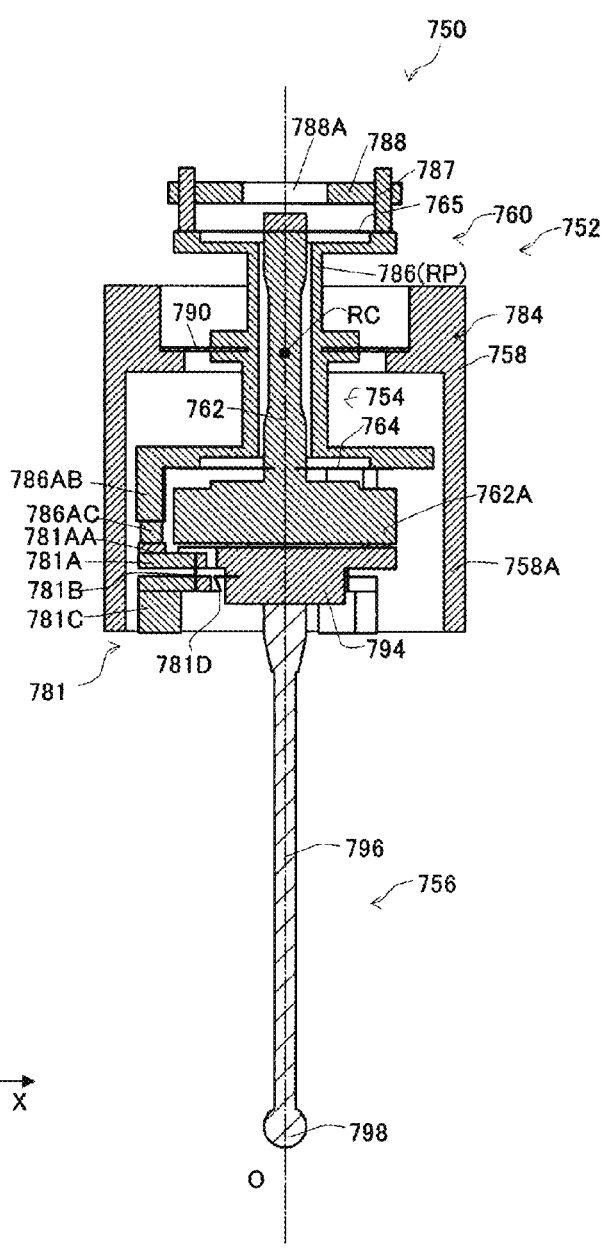
FIG. 8B is a schematic diagram illustrating a cross section of a measuring probe according to a sixth embodiment of the present invention.
Figure 9A:
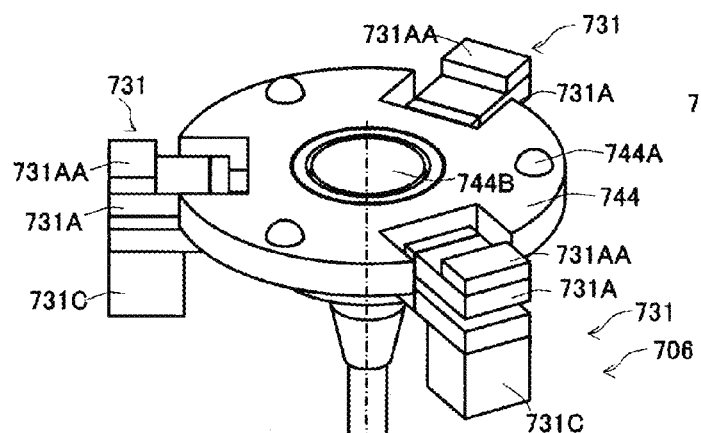
FIG. 9A is a schematic perspective view illustrating a stylus and counterbalance mechanisms according to the fifth embodiment of the present invention.
Figure 9B:
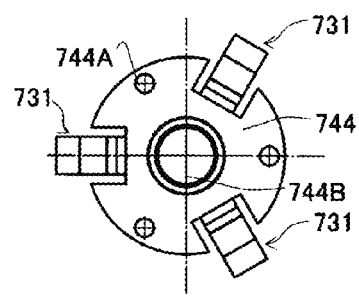
FIG. 9B is a schematic upper view illustrating the stylus and the counterbalance mechanisms according to the fifth embodiment of the present invention.
Figure 9C:
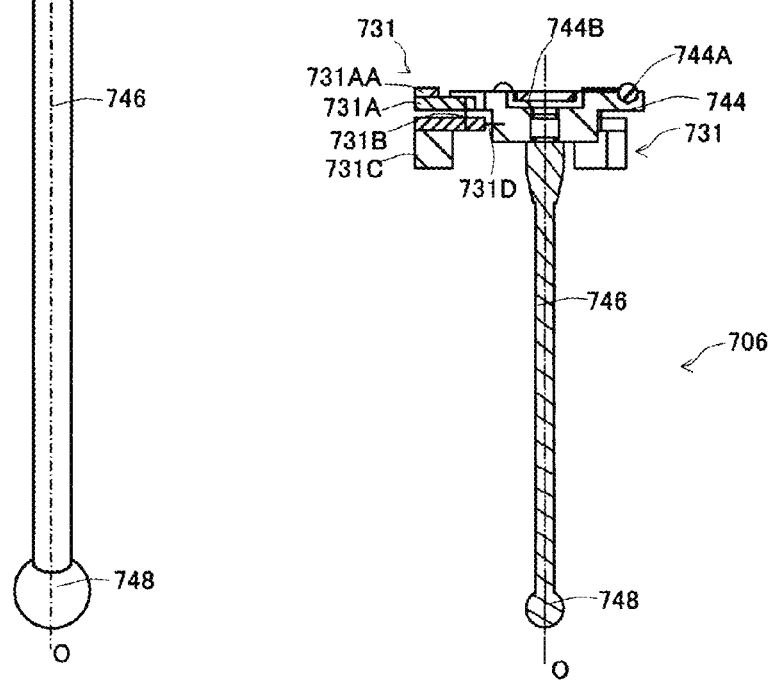
FIG. 9C is a schematic cross-sectional view illustrating the stylus and the counterbalance mechanisms according to the fifth embodiment of the present invention.

FIG. 8B shows the sixth embodiment, which is a variation of the fifth embodiment. The sixth embodiment is different from the fifth embodiment mainly in the addition of a balancing member. Thus, basically the first two digits of their reference numerals are simply changed from the fifth embodiment and description regarding configuration excluding those associated with the balancing member will be basically omitted. Note that a displacement detector is supported in the same way as the above embodiment.

In the sixth embodiment, a rotating member 786 includes an annular-shaped balancing member 788 on a side opposite to a stylus 756 with respect to the rotation center RC of a rotary motion mechanism 784 as shown in FIG. 8B. The balancing member 788 is supported by a supporting part 787 provided on an upper end of the rotating member 786. The balancing member 788 can move in engagement with the supporting part 787. The supporting part 787 allows the adjustment of a distance between the rotation center RC and the balancing member 788. Thus, by changing the distance between the balancing member 788 and the rotation center RC, the center of gravity of the rotating members 786 (member supported by a second diaphragm structure 790) to which different styluses 756 are coupled can be made coincident with the rotation center RC. Thus, in the present embodiment, higher sensitivity of a measuring probe 750 can be achieved than in the above embodiment. Note that such a balancing member capable of adjusting its position may be applied to the structure, as shown in the fifth embodiment, in which the axial motion mechanism supports the rotary motion mechanism.

Note that a counterbalance mechanism can be applied also to a measuring probe 400 shown in the third embodiment. For example, the present invention may be configured as in the seventh embodiment shown in FIG. 10. The seventh embodiment is different from the third embodiment in the addition of a counterbalance mechanism different from that in the fourth embodiment. Thus, for components excluding those different from the third embodiment, basically the first two digits of their reference numerals are simply changed from the third embodiment and the description thereof will be omitted.

Figure 10:
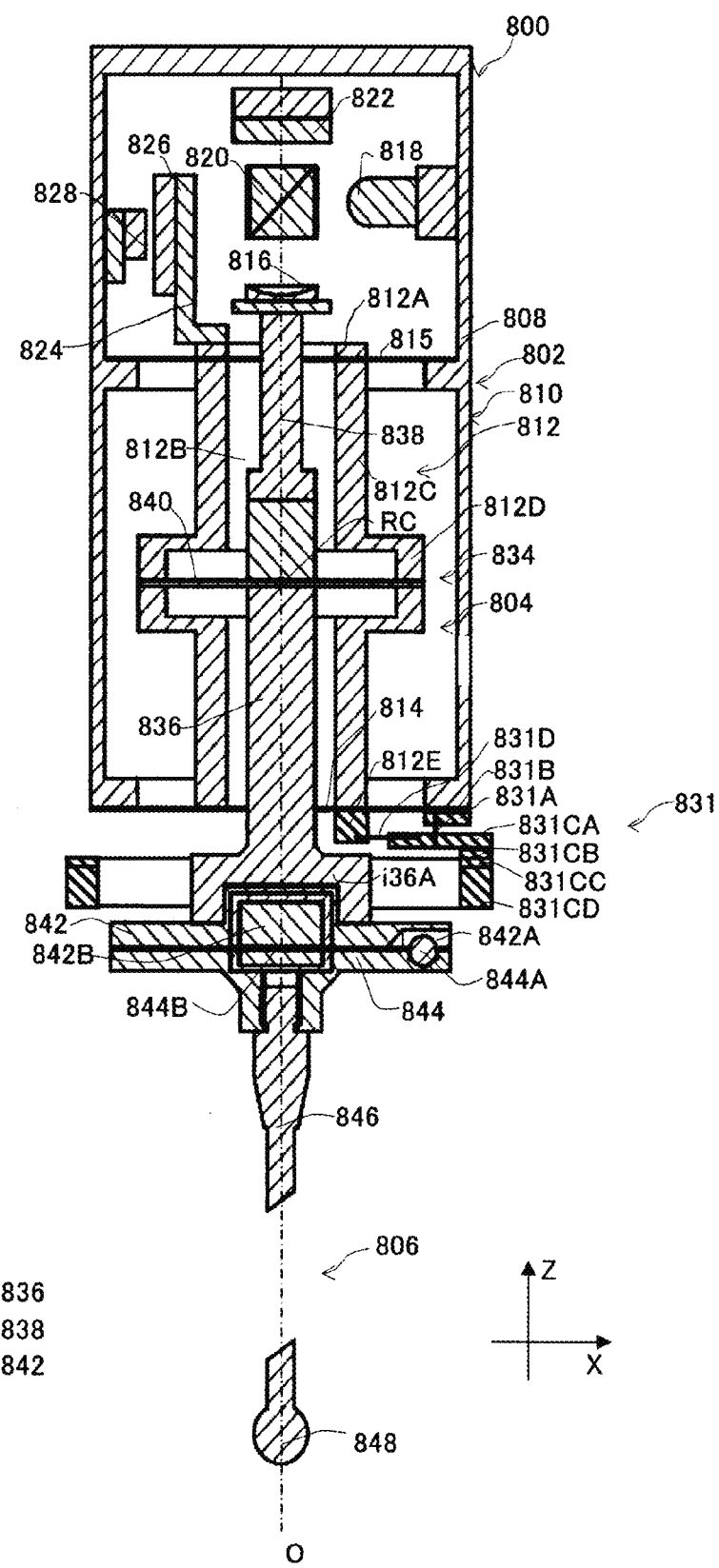
FIG. 10 is a schematic diagram illustrating a cross section of a measuring probe according to a seventh embodiment of the present invention.

In the seventh embodiment, a probe main body 802 includes: a balance weight 831CD corresponding to the mass of a stylus 806; and counterbalance mechanisms 831 as shown in FIG. 10. Unlike the fifth embodiment, the three counterbalance mechanisms 831 are separated from the stylus 806, and fixed to a main body housing (axial element housing member) 808. The three counterbalance mechanisms 831 are supported by the main body housing 808, and configured to keep the stylus 806 and the balance weight 831CD in balance in the Z direction. Specifically, the counterbalance mechanism 831 includes: a supporting member 831A; a support shaft 831B; a coupling portion 831CA; a permanent magnet 831CB; and a coupling shaft 831D. The supporting members 831A are disposed at intervals of 120 degrees in the circumferential direction on a lower end of the main body housing 808. The support shaft 831B is fixed to the supporting member 831A to support the coupling portion 831CA. The coupling shaft 831D is provided in a direction perpendicular to the Z direction at an end of the coupling portion 831CA closer to the central axis O with respect to the support shaft 831B. On the other hand, a connecting portion 812E is provided on a lower end of a moving member 812. A tip of the coupling shaft 831D is coupled to the connecting portion 812E. The permanent magnet 831CB is disposed at an end of the coupling portion 831CA opposite to the coupling shaft 831D with respect to the support shaft 831B.

As shown in FIG. 10, the balance weight 831CD has an annular shape (which may be divided corresponding to the number of the counterbalance mechanisms 831). A magnetic member (which may be a magnet) 831CC attractable to the permanent magnet 831CB is provided on an upper surface of the balance weight 831CD. Note that an inner diameter of the balance weight 831CD is set to be greater than an outer diameter of a flange member 842 and a flange part 844. Thus, the attachment and detachment of the balance weight 831CD are possible even after the coupling of the stylus 806.

Thus, when the stylus 806 is replaced for the single probe main body 802, the balance weight 831CD corresponding to the mass of the changed stylus 806 can be freely attached to the counterbalance mechanism 831. This allows the main body housing 808 to directly receive an increase or decrease in the mass of the stylus 806. More specifically, fluctuations in the initial position of the moving member 812 in the Z direction due to different styluses 806 can be prevented by this configuration. In other words, in the present embodiment, a range of motion for the moving member 812 can be reduced when compared with the third embodiment, thus allowing further miniaturization of the probe main body 802. At the same time, the detection range can be reduced, thus allowing the detection of an amount of displacement of the moving member 812 with a higher resolution.

In the third embodiment, the distance between the lower end 408AB of the opening 408A and the upper end 442C of the flange member 442 is determined to regulate displacement of the moving member 412 so that an amount of deformation in the pair of first diaphragm structures 414 and 415 falls within the range of elastic deformation. In other words, it can be said that the probe main body 402 includes the main body housing 408 and the flange member 442 together serving as the first limiting member for limiting an amount of deformation in the pair of first diaphragm structures 414 and 415 within the range of elastic deformation. By contrast to this, the present invention may be configured as in the eighth embodiment shown in FIG. 11A, for example. The eighth embodiment is different from the third embodiment mainly in relationship between a main body housing and a moving member and relationship between a rotating member and the moving member. Thus, for components excluding those associated with the relationship between the main body housing and the moving member and the relationship between the rotating member and the moving member, basically the first two digits of their reference numerals are simply changed from the fifteenth embodiment and the description thereof will be omitted.

Figure 11A:
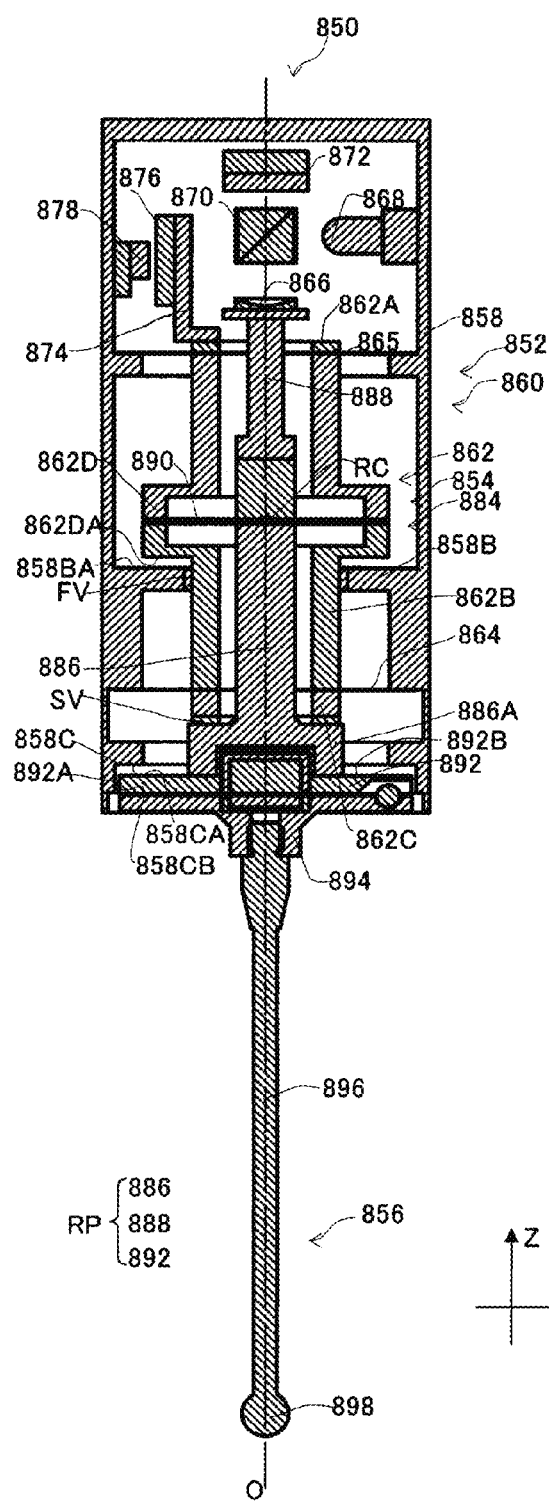
FIG. 11A is a schematic diagram illustrating a cross section of a measuring probe according to an eighth embodiment of the present invention.

In the eighth embodiment, a ring portion 862C is provided at a lower end of a moving member (rotary element housing member) 862 so as to face an upper end of a coupling portion 886A of a rotating member RP as shown in FIG. 11A. In other words, it can be said that the ring portion 862C is a second wall member disposed integrally with the moving member 862. At least part of a gap between (a lower end of) the ring portion 862C and (an upper end of) the coupling portion 886A is filled with a second viscous material SV, such as a grease oil. Consequently, at least the second viscous material SV can damp the displacement of the rotating member RP with respect to the ring portion 862O, reduce vibration in the XY direction caused by the movement of a measuring probe 850, for example, and prevent an increase in noise associated with an increase in the sensitivity of the measuring probe 850.

Also, an inner wall portion 858B is provided in a main body housing (axial element housing member) 858 so as to face an outer side surface of the moving member 862 as shown in FIG. 11A. In other words, it can be said that the inner wall portion 858B is a first wall member disposed so as to face the moving member 862 and to be integral with the main body housing 858. At least part of a gap between (an inner side surface of) the inner wall portion 858B and (an outer side surface of) the moving member 862 is filled with a first viscous material FV, such as a grease oil. Consequently, at least the first viscous material FV can damp the displacement of the moving member 862 with respect to the inner wall portion 858B, reduce vibration in the Z direction caused by the movement of the measuring probe 850, for example, and prevent an increase in noise associated with an increase in the sensitivity of the measuring probe 850.

Furthermore, in the present embodiment, damping structures in the Z direction and the XY direction are separately provided also. Thus, the first viscous material FV and the second viscous material SV can be individually changed. The damping characteristics in the Z direction and the XY direction can be therefore individually optimized, thus allowing a further increase in the sensitivity of the measuring probe 850.

As shown in FIG. 11A, the main body housing 858 is provided with a depressed portion 858C that houses a flange member 892 and restricts excessive displacement of the flange member 892. Also, the inner wall portion 858B is provided in the vicinity of a joining portion 862D of the moving member 862 in the Z direction. Thus, a distance between an upper end 858BA of the inner wall portion 858B and a lower end 862DA of the joining portion 862D of the moving member 862 and a distance between an upper end 858CA of the depressed portion 858C and an upper end 892B of the flange member 892 are determined to regulate displacement of the moving member 862 so that an amount of deformation in a pair of first diaphragm structures 864 and 865 falls within the range of elastic deformation. In other words, it can be said that a probe main body 852 includes the main body housing 858, the moving member 862, and the flange member 892 together serving as a first limiting member for limiting an amount of deformation in the pair of first diaphragm structures 864 and 865 within the range of elastic deformation.

Moreover, a distance between a side surface 858CB of the depressed portion 858C and a side surface 892A of the flange member 892 is determined to regulate displacement of the rotating member RP so that an amount of deformation in a second diaphragm structure 890 falls within the range of elastic deformation as shown in FIG. 18A. In other words, it can be said that the probe main body 852 includes the main body housing 858 and the flange member 892 together serving as a second limiting member for limiting an amount of deformation in the second diaphragm structure 890 within the range of elastic deformation.

Figure 11B:
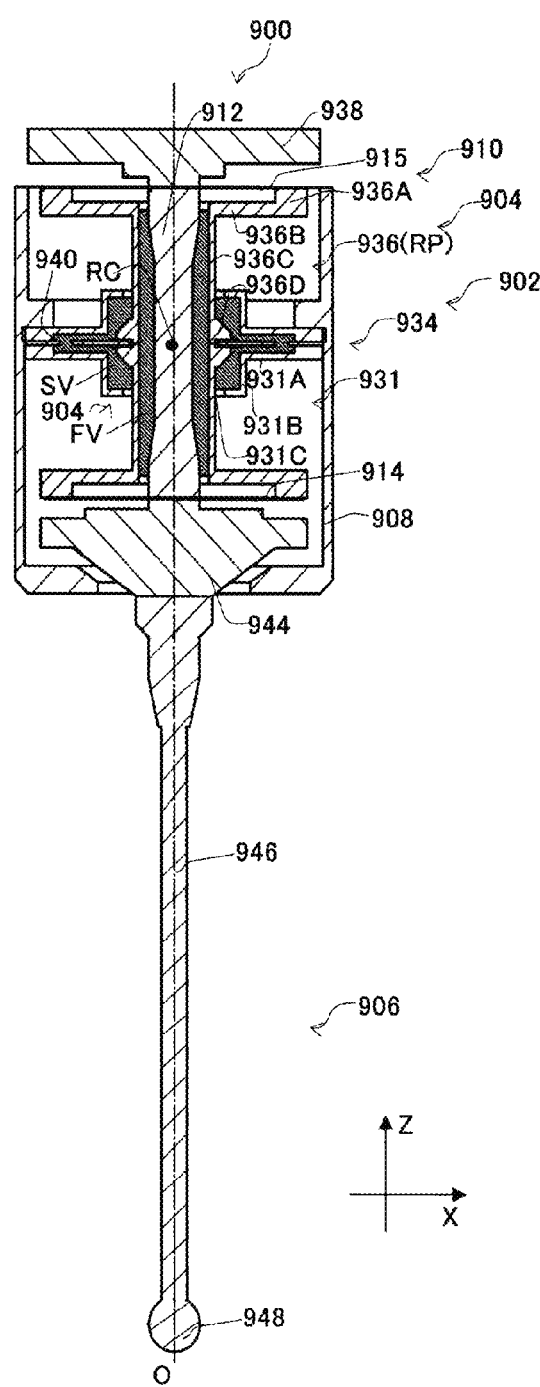
FIG. 11B is a schematic diagram illustrating a cross section of a measuring probe according to a ninth embodiment of the present invention.

FIG. 11B shows the ninth embodiment, which is a variation of the present embodiment, regarding the first viscous material FV and the second viscous material SV. Here, the supporting of the axial motion mechanism by the rotary motion mechanism leads to the direct supporting of the stylus by the moving member as with the first embodiment, etc. The ninth embodiment is different from the first embodiment, etc., mainly in configurations for retaining the first viscous material FV and the second viscous material SV. Thus, for components excluding those associated with the first viscous material FV and the second viscous material SV, basically the first two digits of their reference numerals are simply changed from the first embodiment and the description thereof will be omitted. Note that a displacement detector (not shown) is supported as in the first embodiment, etc. As shown in FIG. 11B, a stylus 906 is directly fixed to a moving member 912 with a flange part 944 without employing a kinematic joint.

In the ninth embodiment, an inner side surface of a cylindrical portion 936C of a rotating member (axial element housing member) 936 is disposed so as to face an outer side surface of the moving member 912 as shown in FIG. 11B. In other words, it can be said that the rotating member 936 is a first wall member disposed so as to face the moving member 912. Then a gap between (the inner side surface of) the cylindrical portion 936C and (the outer side surface of) the moving member 912 is filled with the first viscous material FV, such as a grease oil. Consequently, at least the first viscous material FV can damp the displacement of the moving member 912 with respect to the rotating member 936, reduce vibration in the Z direction caused by the movement of a measuring probe 900, for example, and prevent an increase in noise associated with an increase in the sensitivity of the measuring probe 900.

Also, a viscous material receiver 931 is provided so as to cover a second diaphragm structure 940 from the both sides thereof as shown in FIG. 11B. The viscous material receiver 931 is fixed to a main body housing (rotary element housing member) 908 with its members, each integrally formed by an opposed portion 931A and an expanded portion 931B, facing each other. The opposed portion 931A is a portion facing the second diaphragm structure 940. The expanded portion 931B is a portion covering a joining portion 936D of the moving member 912 in a contactless manner and provided with an opening 931C through which the cylindrical portion 936C can pass. In other words, it can be said that the viscous material receiver 931 is a second wall member disposed to be integral with the main body housing 908. A gap between (an inner side surface of) the viscous material receiver 931 and the second diaphragm structure 940 is filled with the second viscous material SV, such as a grease oil. Consequently, at least the second viscous material SV can damp the displacement of the second diaphragm structure 940 with respect to the viscous material receiver 931, reduce vibration in the XY direction caused by the movement of the measuring probe 900, for example, and prevent an increase in noise associated with an increase in the sensitivity of the measuring probe 900.

Furthermore, in the present embodiment, damping structures in the Z direction and the XY direction are separately provided also. Thus, the first viscous material FV and the second viscous material SV can be individually changed. The damping characteristics in the Z direction and the XY direction can be therefore individually optimized, thus allowing a further increase in the sensitivity of the measuring probe 900.

Although the orientation detector is incorporated in the probe main body in the first to ninth embodiments, the present invention is not limited thereto. For example, the present invention may be configured as in the tenth embodiment shown in FIG. 10. In the tenth embodiment, the probe main body in the first and second embodiments is separable between a beam splitter and a reference member in the axial direction O. In other words, the tenth embodiment is different from the first and second embodiments mainly in the position of an orientation detector. Thus, for components mainly excluding those associated with the position of the orientation detector, basically the first two digits of their reference numerals are simply changed from the first and second embodiments and the description thereof will be omitted.

Figure 12:
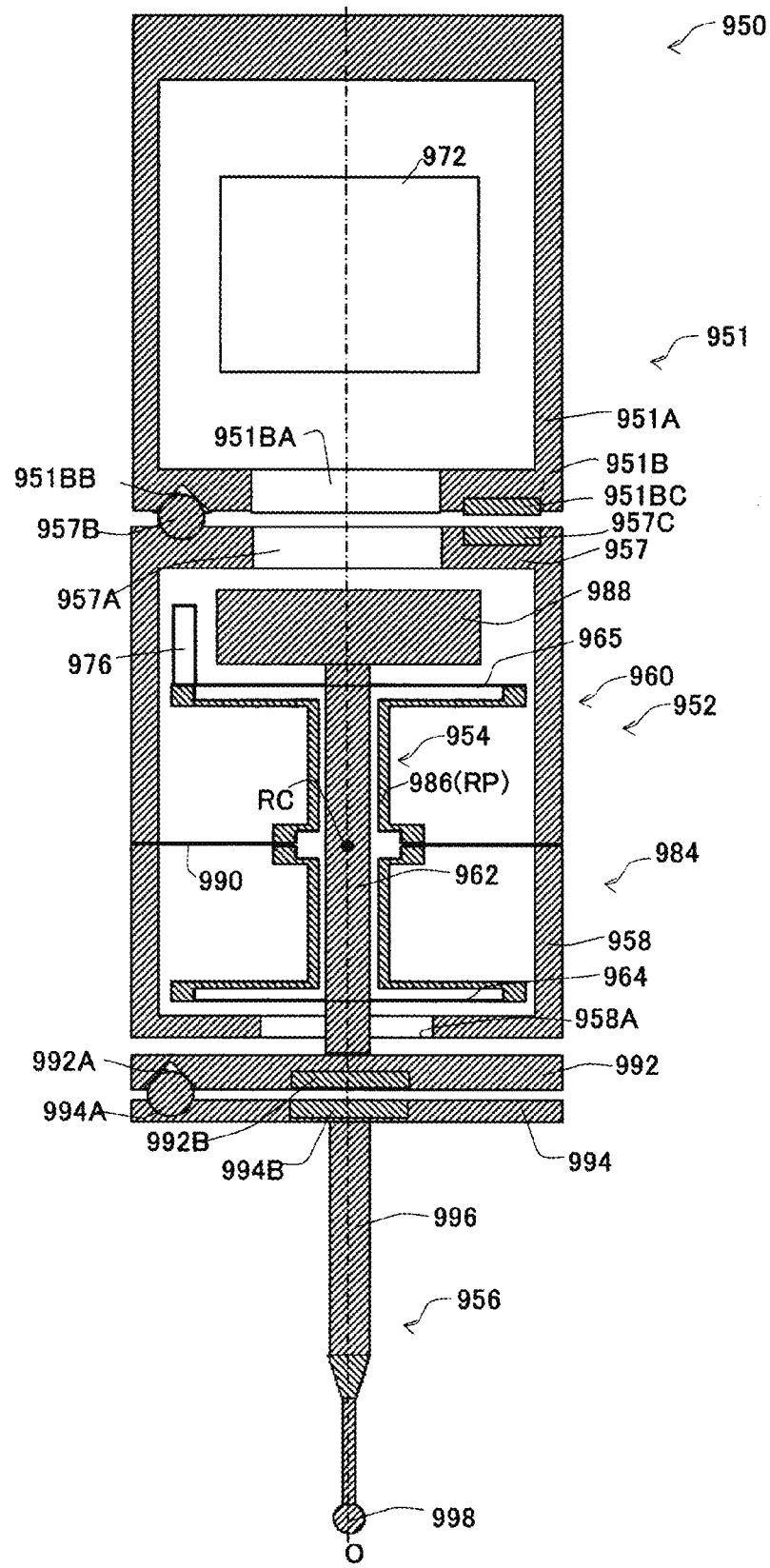
FIG. 12 is a schematic diagram illustrating a cross section of a measuring probe according to a tenth embodiment of the present invention.

In the tenth embodiment, there is provided, as shown in FIG. 12, a preceding module 951, which detachably couples and supports a main body housing 958 that supports both of a moving member 962 and a rotating member 986 with a V-groove (which may be a pair of rollers) 951BB and a ball 957B (engagement part) capable of positioning the main body housing 958. An orientation detector 972 is incorporated in the preceding module 951.

Specifically, the preceding module 951 includes: a preceding housing (preceding housing member) 951A; and the orientation detector 972 as shown in FIG. 12. The preceding housing 951A supports the orientation detector 972 radially inside thereof. The preceding housing 951A is provided with a lower cover 951B at a lower end thereof. The lower cover 951B has a flange shape with an opening 951BA at its center. Along a periphery on a lower end of the lower cover 951B, three V-grooves 951BB are provided at intervals of 120 degrees in the circumferential direction as shown in FIG. 12. Three permanent magnets 951BC are provided so as to be out of phase with the V-grooves 951BB by 60 degrees in the circumferential direction. In other words, the preceding housing 951A detachably couples and supports the main body housing 958 with the V-grooves 951BB and the balls 957B capable of positioning the main body housing 958. The preceding housing 951A houses the orientation detector 972.

As shown in FIG. 12, a probe main body 952 includes: an upper cover 957; the main body housing 958; and a rotary motion mechanism 984. As shown in FIG. 12, the upper cover 957 has a flange shape with an opening 957A at its center. The upper cover 957 is a member corresponding to the lower cover 951B (the opening 957A thus ensures the provision of an optical path for incident light to a reference member (not shown) disposed on an upper end of a balancing member 988, for example, and reflected light from the reference member). Moreover, three balls 957B are disposed at intervals of 120 degrees in the circumferential direction of the upper cover 957 so as to be in contact with the respective V-grooves 951BB. A magnetic member (which may be a permanent magnet) 957C is disposed so as to correspond to the permanent magnet 951BC. In other words, the lower cover 951B and the upper cover 957 together constitute a kinematic joint, which is a detachable coupling mechanism. Such a kinematic joint allows for a high degree of positioning reproducibility even when attachment and detachment between the lower cover 951B and the probe main body 952 are repeatedly performed.

As described above, in the present embodiment, the orientation detector 972 can be eliminated from the probe main body 952 and the orientation detector 972 is incorporated in the preceding module 951. Thus, the probe main body 952 can be easily changed and the preceding module 951 can also be easily changed. More specifically, change in performance or replacement of the set of the axial motion mechanism 960, the rotary motion mechanism 984, and the displacement detector 976 and that of the orientation detector 972 can be independently performed and the cost thereof can be reduced. Moreover, since the orientation detector 972 can be separated from the probe main body 952, the size and cost of the probe main body 952 can be reduced.

Although the moving member 962 directly supports the stylus 906 in the present embodiment, the preceding module may be provided in the case that the rotating member RP directly supports the stylus as in the eighth embodiment.

Although the center of gravity of the members supported by the second diaphragm structure, including the stylus, basically, coincides with the rotation center RC in the above-described embodiments, the present invention is not limited thereto. For example, the center of gravity of the members supported by the second diaphragm structure, including the stylus, may be set on purpose on a side closer to the stylus with respect to the rotation center RC. In this case, the mass and volume of the members supported by the second diaphragm structure on a side opposite to the stylus with respect to the rotation center RC can be minimized. This allows a measuring probe to have an increased natural frequency and a measuring probe having sensitivity to a frequency higher than that in the measuring probes of the first to tenth embodiments (e.g., capable of a fast response) can be thus achieved.

Although the measuring probe is used as a scanning probe in the above embodiments, the present invention is not limited thereto. For example, the measuring probe may be used as a touch probe.

Although the displacement detector is directly supported by the axial element housing member that supports the moving member in the above embodiment, the present invention is not limited thereto. For example, the displacement detector may be supported by the rotary element housing member that supports the rotating member RP or by the preceding module.

The present invention can be widely applied to measuring probes used for measuring a three-dimensional shape of an object to be measured.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A measuring probe including a stylus having a contact part to be in contact with an object to be measured, an axial motion mechanism having a moving member that allows the contact part to move in an axial direction, and a rotary motion mechanism having a rotating member that allows the contact part to move along a plane perpendicular to the axial direction by means of rotary motion, wherein
   the axial motion mechanism includes a plurality of first diaphragm structures that allow the moving member to be displaced, and the rotary motion mechanism includes a second diaphragm structure that allows the rotating member to be displaced,
   the second diaphragm structure is disposed between the plurality of first diaphragm structures in the axial direction,
   the number of the first diaphragm structures is set to an even number,
   the respective first diaphragm structures are disposed at a symmetric distance with respect to the second diaphragm structure, and
   the axial motion mechanism supports the rotary motion mechanism, or the rotary motion mechanism supports the axial motion mechanism.

2. The measuring probe according to claim 1, wherein
   the rotating member includes a balancing member on a side opposite to the stylus with respect to a rotation center of the rotary motion mechanism, and
   a distance between the rotation center and the balancing member is adjustable.

3. The measuring probe according to claim 1, comprising a balance weight corresponding to mass of the stylus, and a counterbalance mechanism supported by an axial element housing member for supporting the axial motion mechanism, the counterbalance mechanism keeping the stylus and the balance weight in balance.

4. The measuring probe according to claim 1, comprising an axial element housing member that supports the axial motion mechanism, and wherein
the axial element housing member is provided with a displacement detector for detecting displacement of the moving member.

5. The measuring probe according to claim 4, wherein the displacement detector outputs a relative position detection signal that allows detection of a relative position of the moving member.

6. The measuring probe according to claim 4, wherein the displacement detector outputs an absolute position detection signal that allows detection of an absolute position of the moving member.

7. The measuring probe according to claim 4, wherein
the axial element housing member is provided with an interference optical system including an interference light source, a reference mirror for reflecting light from the interference light source, and a target mirror disposed in the moving member for reflecting light from the interference light source, the interference optical system capable of causing interference of reflected light from the reference mirror and the target mirror to generate a plurality of interference fringes, and
the displacement detector can detect a phase shift of the plurality of interference fringes generated in the interference optical system.

8. The measuring probe according to claim 1, comprising a preceding housing member that detachably couples and supports a housing member that supports both of the moving member and the rotating member with an engagement part capable of positioning the housing member, and wherein
a reference member is provided on an end, opposite to the stylus, of any of the rotating member and a member supported by the rotating member, and an orientation detector for detecting displacement of the reference member corresponding to a rotary movement of the stylus is housed in the preceding housing member.

9. The measuring probe according to claim 8, wherein
the reference member is a reflecting mirror for reflecting light,
the measuring probe includes a light source for causing light to be incident on the reflecting mirror along an optical axis, and
the orientation detector detects displacement of reflected light, reflected from the reflecting mirror, from the optical axis.

10. The measuring probe according to claim 9, wherein the optical axis is provided so as to pass through the rotation center of the rotary motion mechanism.

11. The measuring probe according to claim 1, wherein
a reference member is provided on an end, opposite to the stylus, of any of the rotating member and a member supported by the rotating member, and
an orientation detector for detecting displacement of the reference member corresponding to a rotary movement of the stylus is housed in a housing member that supports both of the moving member and the rotating member.

12. The measuring probe according to claim 1, comprising a first limiting member for limiting an amount of deformation in the plurality of first diaphragm structures within a range of elastic deformation.

13. The measuring probe according to claim 1, comprising a second limiting member for limiting an amount of deformation in the second diaphragm structure within a range of elastic deformation.

14. The measuring probe according to claim 1, wherein at least part of a gap between a first wall member, which is disposed so as to face the moving member and to be integral with the axial element housing member for supporting the axial motion mechanism, and the moving member, is filled with a first viscous material.

15. The measuring probe according to claim 1, wherein at least part of a gap between a second wall member, which is disposed to be integral with a rotary element housing member for supporting the rotary motion mechanism, and any of the second diaphragm structure and the rotating member, is filled with a second viscous material.

16. A measuring probe including a stylus having a contact part to be in contact with an object to be measured, an axial motion mechanism having a moving member that allows the contact part to move in an axial direction, and a rotary motion mechanism having a rotating member that allows the contact part to move along a plane perpendicular to the axial direction by means of rotary motion, wherein
the axial motion mechanism includes a plurality of first diaphragm structures that allow the moving member to be displaced, and the rotary motion mechanism includes a second diaphragm structure that allows the rotating member to be displaced,
the second diaphragm structure is disposed between the plurality of first diaphragm structures in the axial direction, and
when a particular type of the style is supported by the rotating member, the center of gravity of members supported by the second diaphragm structure coincides with a rotation center of the rotary motion mechanism.

17. The measuring probe according to claim 16, wherein
the number of the first diaphragm structures is set to an even number, and
the respective first diaphragm structures are disposed at a symmetric distance with respect to the second diaphragm structure.

18. The measuring probe according to claim 16, wherein the axial motion mechanism supports the rotary motion mechanism.

19. The measuring probe according to claim 16, wherein the rotary motion mechanism supports the axial motion mechanism.

* * * * *